US008411201B2

(12) United States Patent
Kang et al.

(10) Patent No.: US 8,411,201 B2
(45) Date of Patent: Apr. 2, 2013

(54) METHOD FOR PROVIDING A SHORTCUT AND IMAGE DISPLAY DEVICE THEREOF

(75) Inventors: Haengjoon Kang, Pyeongtaek-si (KR); Myongwon Suh, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 13/028,911

(22) Filed: Feb. 16, 2011

(65) Prior Publication Data

US 2012/0026400 A1 Feb. 2, 2012

Related U.S. Application Data

(60) Provisional application No. 61/369,766, filed on Aug. 2, 2010.

(30) Foreign Application Priority Data

Aug. 3, 2010 (KR) .................. 10-2010-0074874

(51) Int. Cl.
H04N 5/50 (2006.01)
H04N 5/44 (2011.01)
G06F 3/048 (2006.01)
(52) U.S. Cl. ........ 348/569; 348/553; 348/554; 348/705; 715/847
(58) Field of Classification Search .......... 348/731–733, 348/705, 707, 553–570; 715/847
See application file for complete search history.

(56) References Cited

U.S. PATENT DOCUMENTS 5,253,067 A * 10/1993 Chaney et al. ................. 348/570
2004/0135819 A1 * 7/2004 Maa ............................... 345/840

* cited by examiner

*Primary Examiner* — Michael Lee
(74) *Attorney, Agent, or Firm* — KED & Associates LLP

(57) ABSTRACT

A multifunctional display device displays a menu including shortcut objects. A processor assigns each object to one of a broadcast channel, network address, or an application. The objects may be an alphabetical character, number, symbol, or icon.

20 Claims, 34 Drawing Sheets

| SHORTCUT OBJECTS | DESIGNATED MENU ITEMS | DESIGNATED APPLICATIONS | |
|---|---|---|---|
| A | Audio | | |
| B | Bluetooth | | |
| ⋮ | ⋮ | | |
| G | Graphic | google | |
| ⋮ | ⋮ | ⋮ | |
| Y | ⋮ | Yahoo | Youtube |
| ⋮ | ⋮ | ⋮ | |

(a)

(b)

(a)

(b)

(a)

(b)

(a)

(b)

METHOD FOR PROVIDING A SHORTCUT AND IMAGE DISPLAY DEVICE THEREOF

CROSS-REFERENCE TO RELATED APPLICATIONS

This application claims the benefit of and priority to Korean Patent Application No. 10-2010-0074874, filed on Aug. 3, 2010, and to U.S. provisional application No. 61/369,766, filed on Aug. 2, 2010, the contents of which are incorporated herein by reference.

BACKGROUND

1. Field

One or more embodiments described herein relate to a display device.

2. Background

A variety of display devices have been proposed including televisions, computer monitors, and mobile terminals as well as others. Many of these devices display content including broadcast signals, internet websites, DVD and game video just to name a few. In spite of these advancements, improvements are needed especially for purposes of searching for and displaying this content in a convenient way to the user.

DETAILED DESCRIPTION

Figure 1:
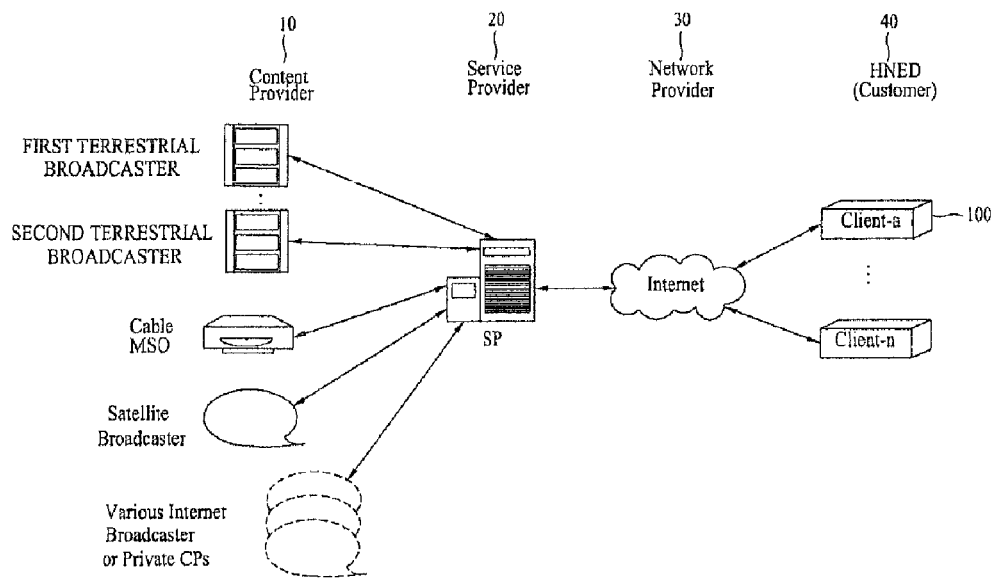
FIG. 1 shows one embodiment of an image display system.

FIG. 1 shows one embodiment of an image display system that includes a content provider (CP) 10, a service provider (SP) 20, a network provider (NP) 30, and a customer 40. The content provider (CP) 10 produces and provides various types of contents. Examples of the content provider (CP) 10 may include terrestrial broadcasters, cable system operators (SOs) or multiple system operators (MSOs), satellite broadcasters, internet broadcasters, and so on. In addition to broadcast contents, the content provider 10 may also provide various types of applications.

The service provider (SP) 20 may packetize the contents provided by the content provider 10 into service packages. For example, the service provider 20 of FIG. 1 may packetize a first terrestrial broadcast program, a second terrestrial broadcast program, a cable MSO, satellite broadcast programs, a diversity of internet broadcast programs, applications, and so on into a service package, thereby providing the packetized service package to the customer (or user).

Also, the service provider 20 may use a unicast or multicast method so as to provide services to the customer (or user) 40. The unicast method corresponds to a one-to-one (1:1) transmission method transmitting data between one transmitter and one receiver (or recipient). For example, in case of the unicast method, when a receiver sends a request for data to the server, the server may transmit the corresponding data to the receiver in accordance with the request made by the receiver.

The multicast method corresponds to a transmission method transmitting data to a specific group of multiple receivers (or recipients). For example, the server may simultaneously transmit data to multiple receivers that have been registered in advance. In order to perform such multicast registration, an internet group management protocol (IGMP) may be used.

The network provider (NP) 30 may provide a network for providing services to the customer 40. And, the customer 40 may build (or configure) a home network (i.e., a home network end user (HNED)) so as to be provided with diverse services.

Conditional access or content protection may be used as a means for protecting the contents that being transmitted from the above-described image displaying system. Exemplary methods of such conditional access or content protection may include the use of a CableCARD, a downloadable conditional access system (DCAS), and so on.

By using the network, the customer 40 may also be capable of providing contents. In this case, unlike as described above, the customer 40 may become the content provider, and the content provider 10 may receive contents from the customer 40. Thus, a two-way (or bi-directional) content service or data service may be realized.

Figure 2:
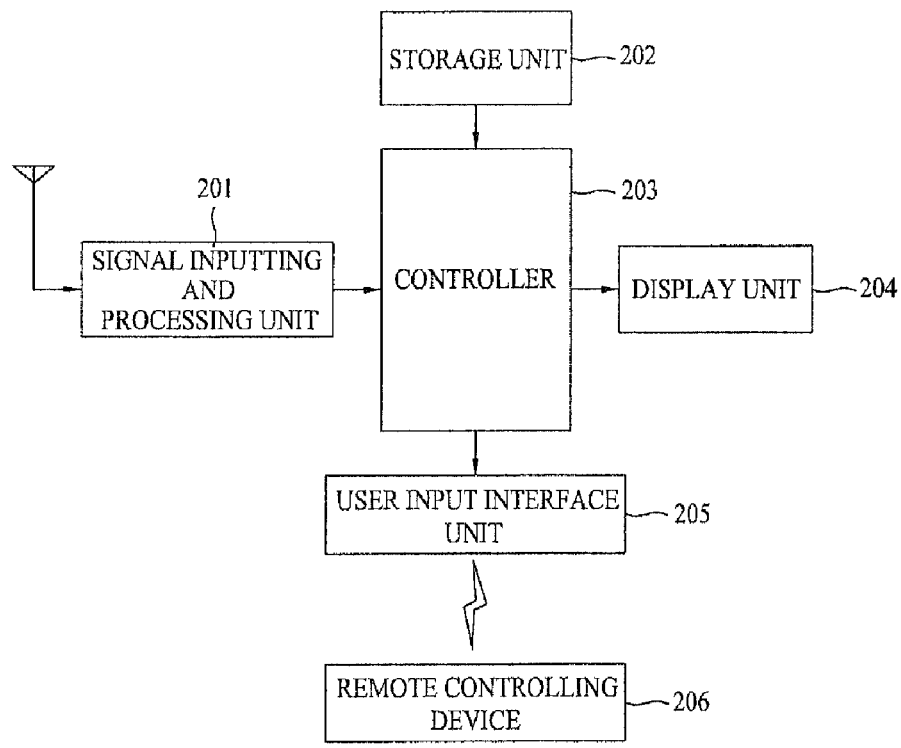
FIG. 2 shows an embodiment of a display device in this system.

FIG. 2 shows one embodiment of a display device in the system. The display device includes a signal inputting and processing unit 201, a storage unit 202, a controller 203, and a user interface unit 205. The image display device may also include a display unit 204.

Because the image display device corresponds to a device that can display a predetermined set of images, the image display device includes a digital broadcast receiver, such as a digital television, or a digital broadcasting device, such as a set-top box, that can receive and display digital broadcast signals. In case the image display device is a digital television, the image display device may internally include a display unit 204. On the other hand, in case the image display device is a set-top box, instead of a display unit being included in the image display device, a device performing a display function may be externally connected to the image display unit.

In FIG. 2, the display device is shown as a digital television, which internally includes a display unit. Herein, the signal inputting and processing unit may include a broadcast receiver (not shown) and an external device interface unit (not shown). Also, the broadcast receiver may include a tuner (not shown), a demodulator (not shown), and a network interface unit (not shown). The tuner and the demodulator may be optionally provided with the network interface unit.

Among radio frequency (RF) broadcast signals that are received through an antenna, the tuner selectively receives an RF broadcast signal that is being transmitted through a frequency band of a specific channel selected by the user (or customer) or through a frequency band of all pre-stored channels. Also, the tuner converts the selected RF broadcast signal to an intermediate frequency signal or a baseband video or audio signal.

The demodulator receives the signal outputted from the tuner and performs demodulation operations on the received signal. After performing demodulation and channel decoding, the demodulator may output a transfer stream (TS) signal.

The transfer stream (TS) signal outputted from the demodulator may be inputted to the controller 203. The controller 203 performs demultiplexing, audio/video signal processing, and so on, on the received TS signal, thereby displaying an image to the display unit 204.

The external device interface unit may connect the external device and the image display device. In order to do so, the external device interface unit may include an A/V input/output unit (not shown) or a wireless (or radio) communications unit (not shown).

The A/V input/output unit may include USB terminal, a CVBS (Composite Video Banking Sync) terminal, a component terminal, an S-video terminal (analog), a DVI (Digital Visual Interface) terminal, an HDMI (High Definition Multimedia Interface) terminal, an RGB terminal, a D-SUB terminal, and so on, so as to be able to input audio and video signals of the external device to the image display device.

The wireless (or radio) communications unit is capable of performing close range wireless (or radio) communication with other electronic devices. Based upon the telecommunication standards, such as Bluetooth, RFID (Radio Frequency Identification), IrDA (Infrared Data Association), UWB (Ultra Wideband), ZigBee, DLNA (Digital Living Network Alliance), and so on, the image display device may be connected to other electronic devices via network.

Furthermore, the external device interface unit may access diverse set-top boxes via at least one of the above-described terminals, thereby being capable of performing input/output operations with the respective set-top box.

Meanwhile, the external device interface unit receives an application or a list of applications within a neighboring external device, and the external device interface unit may then deliver the received application or list of applications to the controller 203 or the storage unit 202.

The network interface unit provides an interface for connecting the image display device to a wired/wireless network including an internet network. In order to provide connection (or access) to a wired network, the network interface unit may be provided with an Ethernet terminal. And, in order to provide connection (or access) to a wireless network, the network interface unit may be provided with diverse telecommunication standards, such as WLAN (Wireless LAN) (Wi-Fi), Wibro (Wireless broadband), Wimax (World Interoperability for Microwave Access), HSDPA (High Speed Downlink Packet Access), and so on.

The network interface unit may be connected to a particular webpage via network. More specifically, the network interface unit may access a particular webpage through a network connection, thereby being capable of transmitting or receiving data to or from a respective server. Additionally, the network interface unit may also receive contents or data provided from a content provider or a network provider. More specifically, the network interface unit may receive contents including movies, commercials (or advertisements), games, VODs, broadcast signals, and so on, that are provided from the content provider or network provider and may also receive information related to such contents. In addition, the network interface unit may receive update information or update files of firmware provided by a network provider. Furthermore, the network interface unit may also transmit data through the internet or to the content provider or network provider.

Moreover, through the network, the network interface unit may select a wanted application among a plurality of applications that are open in the air and may then receive the selected application.

The storage unit 202 may store programs for processing and controlling each signal within the controller 203 and may also store signal-processed video, audio or data signals. Additionally, the storage unit 202 may perform the function of temporarily storing video, audio or data signals that are being inputted from the external device interface unit or the network interface unit. Also, the storage unit 202 may store information associated to particular broadcast channels through a channel memory function.

Further, the storage unit 202 may store the application or list of applications that is being inputted from the external device interface unit or the network interface unit. More specifically, the storage unit 202 may store shortcut mapping data in the form of a look-up table or database.

Although FIG. 2 shows an example wherein the storage unit 202 is provided separately from the controller 203, the embodiments herein should not be limited to this exemplary structure. The storage unit 202 may also be included in the controller 203.

The user input interface unit 205 either delivers (or sends) a signal inputted by the user to the controller 203 or delivers a signal outputted from the controller 203 to the user. For example, in accordance with diverse telecommunication methods, such as Bluetooth, RF (Radio Frequency) communication, Infrared (IR) communication, UWB (Ultra Wideband), Zigbee, and so on, the user input interface unit 205 receives a user input signal or control signal, such as power on/off, channel selection, screen settings, and so on, from a remote controlling device 206 and processes the received signal.

Alternatively, the user input interface unit 205 may process a control signal received from the controller 203 so that the corresponding signal can be transmitted to the remote controlling device 206.

Also, for example, the user input interface unit 205 may deliver (or send) a user input signal or control signal that is being inputted from a local key, such as a power key, a channel key, a volume key, a set-up key, and so on, to the controller 203.

Additionally, for example, the user input interface unit 205 may receive a particular Character (or Letter) Select signal of the Shortcut menu.

Therefore, a user input signal or control signal that is being inputted from a sensor that senses a user's gesture is delivered to the controller 203, or a signal outputted from the controller 203 may be transmitted to the sensor. Herein, the sensor may include a touch sensor, a voice sensor, a position sensor, a motion sensor, and so on.

More specifically, the user input interface 205 receives a remote control signal being transmitted from the remote controlling device 206, which is externally provided. Through the tuner or the demodulator or the external device interface unit, the controller 203 demultiplexes an inputted stream or processes demultiplexed signals, thereby generating and displaying signals for video or audio output.

An audio signal that is image-processed (or audio-processed) by the controller 203 is inputted to the display unit 204, so that the processed signal may be displayed as an image respective to the corresponding video signal. Also, the audio signal that is image-processed (or audio-processed) by the controller 203 may be inputted to an external output device through the external device interface unit.

Although it is not shown in FIG. 2, the controller 203 may include a demultiplexer, an image processing unit, and so on. Additionally, the controller 203 may control the overall operations within the image display device.

When accessing (or entering) a See Application item, the controller 203 may perform controlling operations allowing an application or a list of applications to be displayed, wherein the application(s) can be downloaded from a network within or outside of the image display device.

Along with a variety of user interfaces, the controller 203 may control the image display device so that the applications that are downloaded from the external network can be installed and executed (or driven). Also, in accordance with the user's selection, the controller 203 may perform controlling operations allowing an image associated with the application that is being executed to be displayed on the display unit 204.

Furthermore, the controller 203 outputs a shortcut menu including a list of characters (or letters) of a specific language to the display unit 204 through the user interface. And, when a specific Character (or Letter) Select signal is inputted through the user input interface 205, a shortcut corresponding to the particular character (or letter) respective to the Select signal may be executed.

The display unit 204 respectively converts the video signal, the data signal, and the OSD signal processed by the controller 203 or the video signal and data signal received from the external device interface unit to R, G, and B signals, thereby generating a Drive signal. Examples of the display unit 204 may include PDP, LCD, OLED, flexible display, 3D display, and so on.

Meanwhile, the display unit 204 is configured of a touch screen, and, in addition to being used as an output device, the display unit 204 may also be used as an input device. The display unit 204 may further include a filming (or detecting) unit for filming (capturing image(s) of) the user. Although the filming unit may be embodied by using one camera, other detection sensors may be used. For example, the filming unit may also be configured of a plurality of cameras. The video information filmed by the filming unit (not shown) is inputted to the controller 203.

In order to sense (or detect) the gesture of the user, a sensing unit equipped with at least one of a touch sensor, a voice sensor, a position sensor, and a motion sensor may be further provided to the image display device. The signal sensed by the sensing unit may be delivered to the controller 203 through the user interface unit 205.

The controller 203 may also use each of the image filmed by the filming unit or the signal sensed (or detected) by the sensing unit, or may use a combination of the filmed image and the sensed signal, so as to sense (or detect) the gesture of the user.

The remote controlling device 206 transmits the user input to the user input interface unit 205. In order to do so, the remote controlling device 206 may use telecommunications methods such as Bluetooth, RF (Radio Frequency) communication, Infrared (IR) communication, UWB (Ultra Wideband), Zigbee, and so on.

The user may input a control signal for selecting a particular character (or letter) from the Shortcut menu via the remote controlling device 206. Also, the remote controlling device 206 may receive a video, audio or data signal outputted from the user input interface unit 205, so that the received signal can be displayed on the remote controlling device 206, or so that the received signal can be outputted as a voice output or vibration.

The image display device described in the present invention may correspond to a display device excluding the display unit 204 shown in FIG. 2. Accordingly, the image display device described in the present invention may correspond to wireless type image display device, which can transmit and receive data to and from the display unit 204 via wireless communication.

Meanwhile, the block view of FIG. 2 corresponds to a block view illustrated to show an exemplary image display device. Therefore, each component (or element) of the block view may be integrated, added, or omitted depending upon the specifications of the image display device that actually being configured (or embodied). In other words, when required, two or more components may be integrated to a single component, or one component may be divided into two or more components. Furthermore, the functions performed by each block are merely exemplary functions given to facilitate the description of the present embodiment and should limit any other embodiment. Also, the image display device in FIG. 2 may perform the operation steps for providing a shortcut as described with reference to FIG. 3 to FIG. 13.

Figure 3:
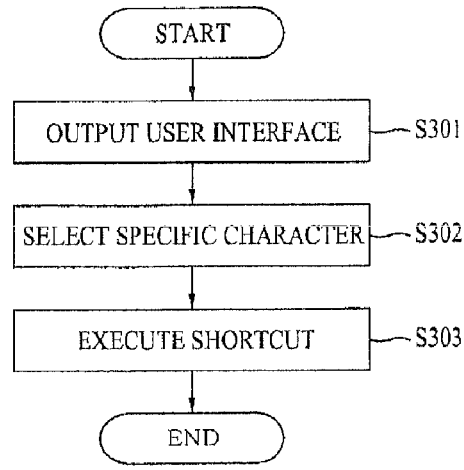
FIG. 3 shows one method for providing a shortcut to access content.

FIG. 3 shows one embodiment of a method for providing a shortcut. The method may be performed using any of the embodiments of the image display device described herein, and involves outputting a Shortcut menu through a user interface of the device.

The Shortcut menu includes a list of characters (or letters) written in a specific language that can be set-up as a shortcut object (S301). More specifically, Step 301 may be performed by having the controller 203 generate and output a user interface including the above-described Shortcut menu, and by having the outputted user interface be displayed through the display unit 204.

The user interface may be displayed based on activation of a Hot-key of the image display device and/or a remote controller, or the user interface may be displayed when power is supplied to the image display device and/or based on one or more predetermined settings of the image display device.

To allow access to predetermined content or a specific application through the display device, the user interface may include a Shortcut menu that can be immediately and conveniently called by activation of the Hot-key.

For example, when the user (or customer) is viewing a terrestrial broadcast program through the image display device, or when the user is browsing a particular web site through an application, or even when the user is searching for a menu item of the image display device in order to execute a particular function of the image display device, the user interface including the Shortcut menu may be outputted to the display unit of the image display unit by simply activating a Hot-key of the remote controller.

In order to avoid an interruption in usage of content or an application currently being executed within the image display device, the Shortcut menu may be marked in semi-transparent colors, or the Shortcut menu may be displayed in a predetermined area wherein content or applications are not outputted. Therefore, even when the Shortcut menu is output, the user may continue to use the content or application that is currently being executed.

The Shortcut menu includes a list of characters (or letters) written in a specific language. For example, when the viewer (or user or customer) of the image display device sets up the system language of the image display device to 'English', the list of characters (or letters) may include a list of the English alphabet starting from 'A' to 'Z'.

Alternatively, if the viewer of the image display device sets up the system language of the image display device to 'Korean', the list of characters (or letters) may include a list of the initial consonants of the Korean characters starting from 'ㄱ' to 'ㅎ'. Furthermore, depending upon the embodiment of the present invention, the list of characters (or letters) may include a predetermined list of numbers.

Thereafter, a specific character (or letter) is selected from the list of characters (or letters) (S302). The list of characters will be described in more detail with reference to FIG. 8 and FIG. 9.

More specifically, the image display device receives a Select signal of the specific character from the user through the user input interface unit. Subsequently, a Shortcut corresponding to the selected character is executed (S303). The Shortcut may include operations of shifting (or moving) to a particular Menu item of the image display device or executing a specific application of the image display device.

Figure 4:
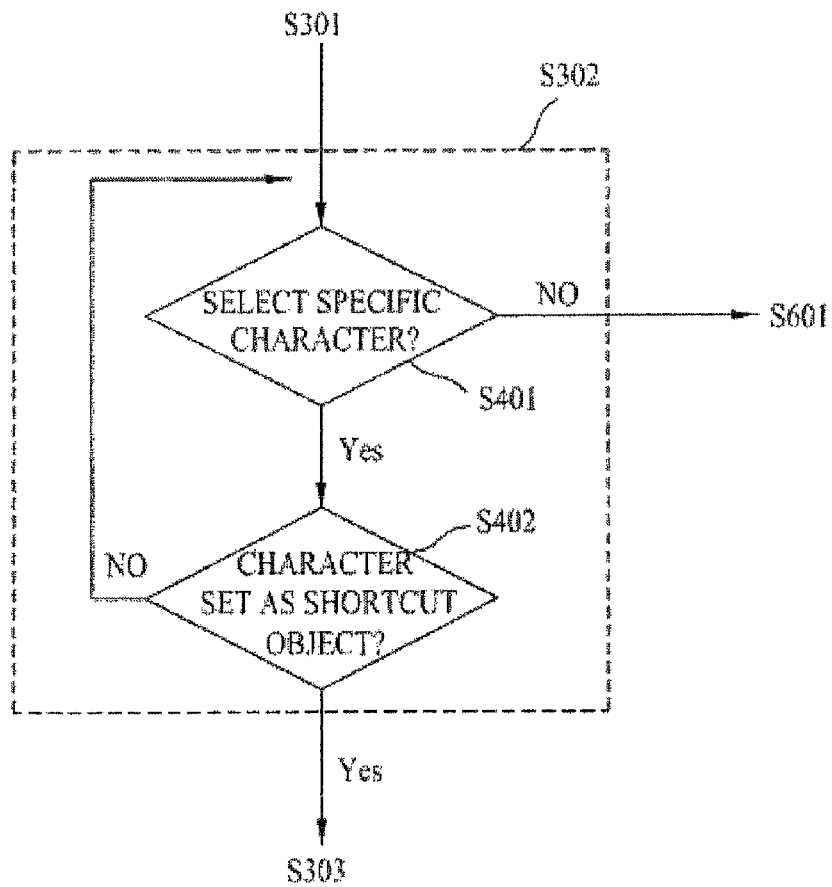
FIG. 4 shows one way in which a step in the method may be performed.

FIG. 4 provides a more detailed explanation of step (S303) which is performed when a predetermined character (or letter) is selected in step (S302). As shown in FIG. 4, step (S303) includes a Step S401 which determines whether or not a Select signal of a specific character within the Shortcut menu is received in Step 302 through the user input device.

According to one embodiment, when there is no input signal for a predetermined period of time, the user interface may be deleted (or removed) from the display unit of the Shortcut menu.

When a specific character is selected in Step 401, it is determined whether or not the selected character corresponds to a character set up as the shortcut object (S402).

When the Select signal of the specific character is received, the image display device searches the database of the image display device so as to determine whether or not a designated Menu item or designated application mapped to the shortcut exists.

According to one embodiment, the user interface of the Shortcut menu may differentiate the characters set up as the shortcut objects from the characters that are not set up as the shortcut objects from the list of characters and may display the corresponding characters differently. One possible example of how the characters may be displayed in a differentiated manner will be described with reference to FIG. 8.

Figure 5:
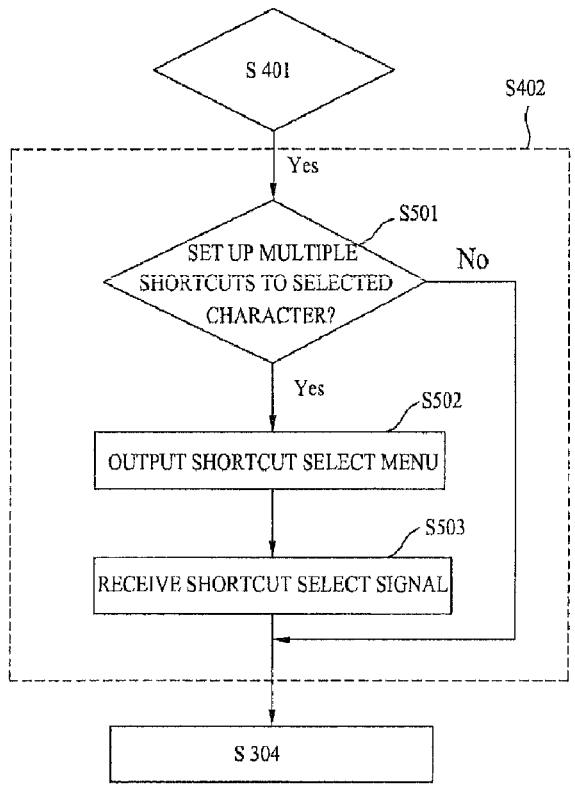
FIG. 5 shows one way in which a step in FIG. 4 may be performed.

FIG. 5 provides a more detailed explanation of how step (S402) may be performed for determining whether or not a selected character (or letter) corresponds to a character (or letter) set up as a shortcut object. When a particular character is selected in Step 401 of FIG. 4, it is determined whether or not a plurality of shortcuts is mapped to the selected character (S501).

In case a plurality of shortcuts is mapped to the selected character, a Shortcut Select menu for selecting at least one or more shortcuts among the plurality of shortcuts is outputted (S502). Thereafter, at least one or more Shortcut Select signals are received from the Shortcut Select menu of Step 502 (S503).

Figure 6:
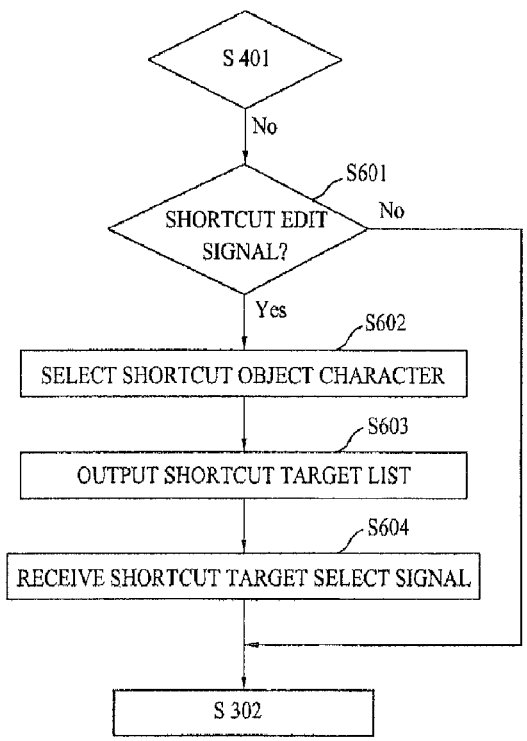
FIG. 6 shows one embodiment of a method for mapping shortcuts to predetermined characters (or letters).

FIG. 6 shows one embodiment of a method for mapping shortcuts to predetermined characters (or letters). When a Select signal of a specific character is not received in Step 401 of FIG. 4, it may be determined whether or not a Shortcut Edit signal is received (S601).

When at least any one of a Select signal of a Shortcut Edit Menu item included in the Shortcut menu or a Hot Key Input signal of the image display device or remote controller is received, the received signal may be recognized as a Shortcut Edit signal. When the Shortcut Edit signal is inputted through the Hot key input, the user may be able to edit the Shortcut quickly and easily.

Also, unlike FIG. 4, even when the Select signal of the specific character is received, if the specific character corresponds to a character that is not set up as a shortcut object, the Select signal of the specific character may be recognized as a Shortcut Edit signal. Subsequently, when the Shortcut Edit signal is received, a character that is to be set up as a shortcut object may be selected (S602).

According to one embodiment, the user may select a specific character that is to be mapped to a shortcut from a list of characters written in a specific language, wherein the list of characters is included in the Shortcut menu item. Thereafter, a list of items that are to be set up as shortcut objects is outputted through user interface (S603).

According to one embodiment, the list of items may correspond to a list of specific menu items of the image display device or a list of specific applications that can be used in the image display device. And, only a list including specific items respective to the selected specific characters may be outputted.

For example, in Step 602, when the user selects the English letter 'M' as the character that is to be set up as the shortcut object, a list including items having the names of MUSIC, METRO, MANAGEMENT, and so on, which correspond to items associated with the English letter 'M', may be outputted. Subsequently, at least one or more items that are to set up the selected character as the shortcut object are selected from the list (S604).

When the Select signal is received from the user, the image display device applies the mapping information based upon the Select signal so as to update the Shortcut mapping data. An example of Shortcut mapping data will be described with reference to FIG. 16.

Figure 7:
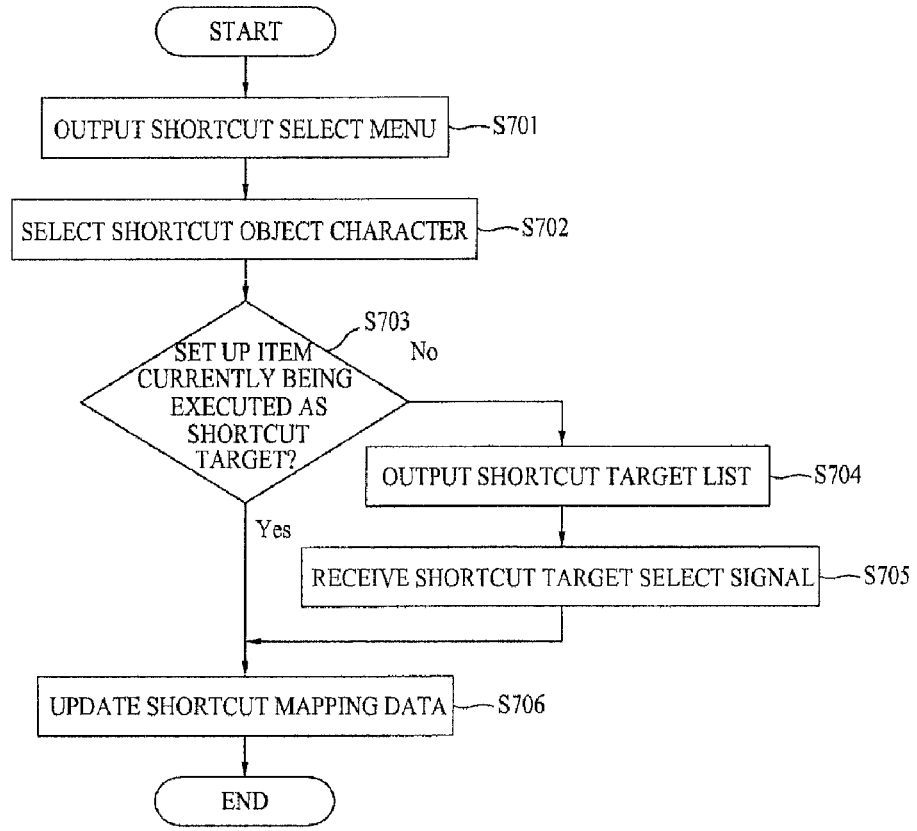
FIG. 7 shows another embodiment of a method for mapping shortcuts to predetermined characters (or letters).

FIG. 7 shows another embodiment of mapping shortcuts to predetermined characters (or letters). The image display device outputs a user interface including a Shortcut Select menu to the display unit (S701).

When at least any one of an Edit Menu Item Select signal of the Shortcut menu and a Hot Key Input signal of the image display device or remote controller is inputted, the image display device may output the Shortcut Select menu to the display unit.

The Shortcut Edit menu includes a list of characters (or letters) written in a specific language. Also, in order to avoid interruption in the usage of the content or application that is currently being executed within the image display device, either the Shortcut menu is marked in semi-transparent colors, or the Shortcut menu may be displayed in a predetermined area wherein contents or applications are not outputted.

Afterwards, the image display device receives a Select signal of a character that is to be set up as the shortcut object from the list of characters written in a specific language (S702). The user may select a wanted character (or letter) by using a key button and keypad of the image display device or remote controller.

Subsequently, the image display device outputs a user interface for selecting whether or not to set up the item, which is currently being executed in the image display device, as the shortcut target respective to the selected character (S703). An example of a user interface will be described with reference to FIG. 14.

In Step 703, when the user does not set up the item as the shortcut function respective to the selected character, the image display device outputs a Shortcut Target List.

According to one embodiment, the shortcut target list may correspond to a list including specific Menu items of the image display device or a list including specific applications available to the image display device. Herein, a list including specific items respective to the selected character (or letter) may be outputted. This is similar to the example shown in FIG. 6.

Subsequently, the image display device may select a shortcut function that is to be set up as the shortcut target respective to the specific character selected from the list (S705).

When the user selects an item, which is currently being executed in the image display device, as a shortcut object in Step 703, or when the user inputs a Select signal of a Shortcut target in Step 705, the image display device updates the shortcut mapping data (S706).

According to one embodiment, after performing the updating operations, the image display device may output a Shortcut menu, or the image display device may output a content or application execution screen prior to displaying a Shortcut Select Menu.

In accordance with the above-described Shortcut mapping process, when the user sets up a shortcut to a menu item or application that is currently being executed (or used) by the image display device, the user may be capable of setting up shortcut mapping data having the menu item or application, which is currently being executed, as the shortcut target by simply inputting a particular key.

Figure 8:
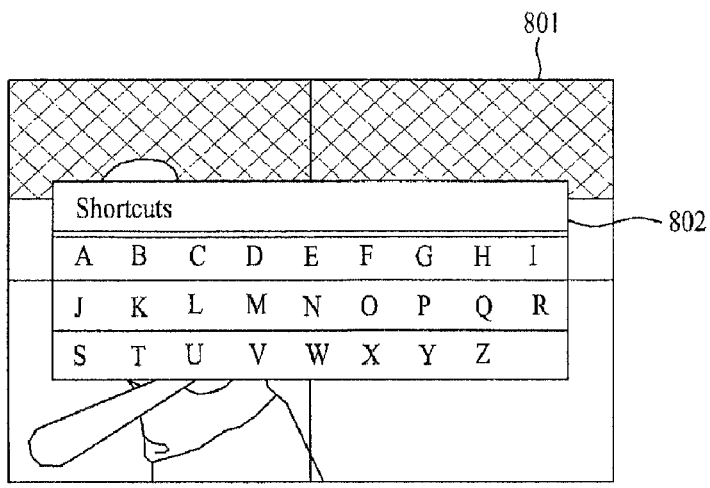
FIG. 8 shows one embodiment of a display screen with a Shortcut menu.

FIG. 8 shows one example of a display screen 801 including a Shortcut menu 802. The display screen 801 includes a Shortcut menu 802 including a list of characters (or letters) written in a specific language. While a specific content is displayed on the display screen 801 of the display unit included in the image display device, a Shortcut menu 802 including the list of characters written in a specific language that can be set up as shortcut objects may be outputted to a predetermined region of the display screen as the user interface.

When the user sets up the system language of the image display device to 'English', the list of characters (or letters) may include a list of the English alphabet starting from 'A' to 'Z'. Alternatively, if the user sets up the system language of the image display device to 'Korean', the list of characters (or letters) may include a list of the initial consonants of the Korean characters starting from 'ㄱ' to 'ㅎ'. In one embodiment, the list of characters (or letters) may include a predetermined list of numbers.

Furthermore, in order to prevent the Shortcut menu from interrupting the usage of the content or application that is currently being executed within the image display device, the Shortcut menu is marked in semi-transparent colors, or the Shortcut menu may be displayed in a predetermined area wherein contents or applications are not outputted.

Thus, by using the above-described Shortcut menu, the user may be capable of conveniently searching and executing diverse menu items or applications of the image display device from a single display screen.

More specifically, by setting up diverse menu items or applications of the image display device as shortcut objects by using the specific characters associated with each of the menu items or applications, and by having such menu items or applications be executed through the above-described Shortcut menu, the user may be capable of selecting a specific character (or letter) from the list of characters, thereby searching all menu items or applications within a single display screen.

Figure 9:
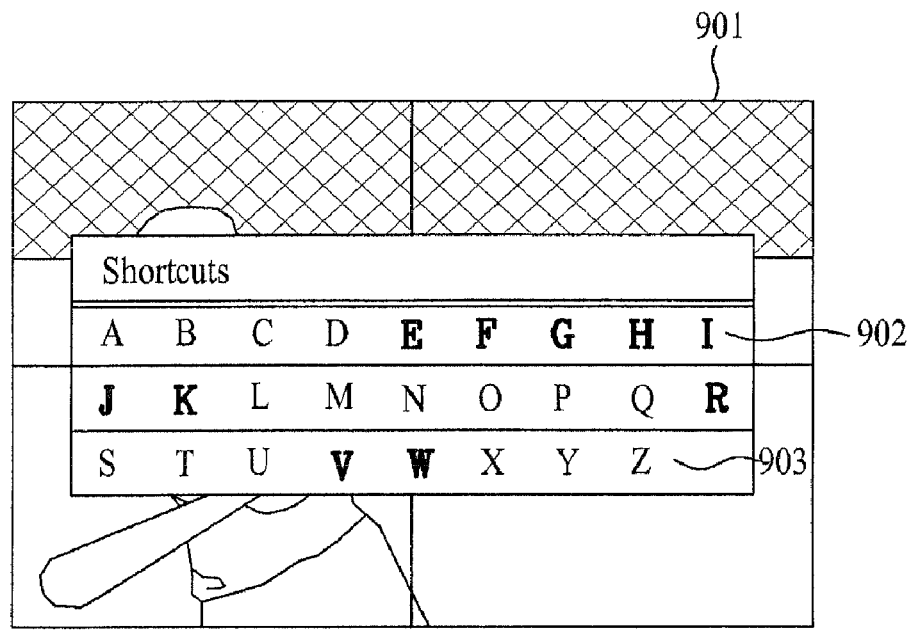
FIG. 9 shows another embodiment of a screen with a Shortcut menu.

FIG. 9 shows a display screen including a Shortcut menu. As shown and described in FIG. 8, while displaying a specific content to the display screen, the display screen 801 of FIG. 9 may include a Shortcut menu including a list of characters written in a specific language. However, the characters (or letters) set up as shortcut objects 902 may be differentiated from the characters (or letters) that are not set up as shortcut objects 903, and the corresponding characters 902 and 903 are marked differently.

According to one embodiment, the characters (or letters) set up as shortcut objects 902 may be marked in a bolder font as opposed to the characters (or letters) that are not set up as shortcut objects 903. The characters (or letters) that are not set up as shortcut objects may be marked in thin fonts, in dotted lines, or in semi-transparent colors. In other embodiments, a different way of differentiating letters or numbers representing shortcuts from those which are not related to shortcuts may be provided. For example, the characters (or letters) set up as shortcut objects 902 may be marked in character types, font colors, and/or border designs different from those used to mark the characters (or letters) that are not set up as shortcut objects 903.

By using the above-described user interface, the user may be capable of intuitively determining which particular character, among the multiple characters included in the Shortcut menu, is set up as the Shortcut object.

Figure 10:
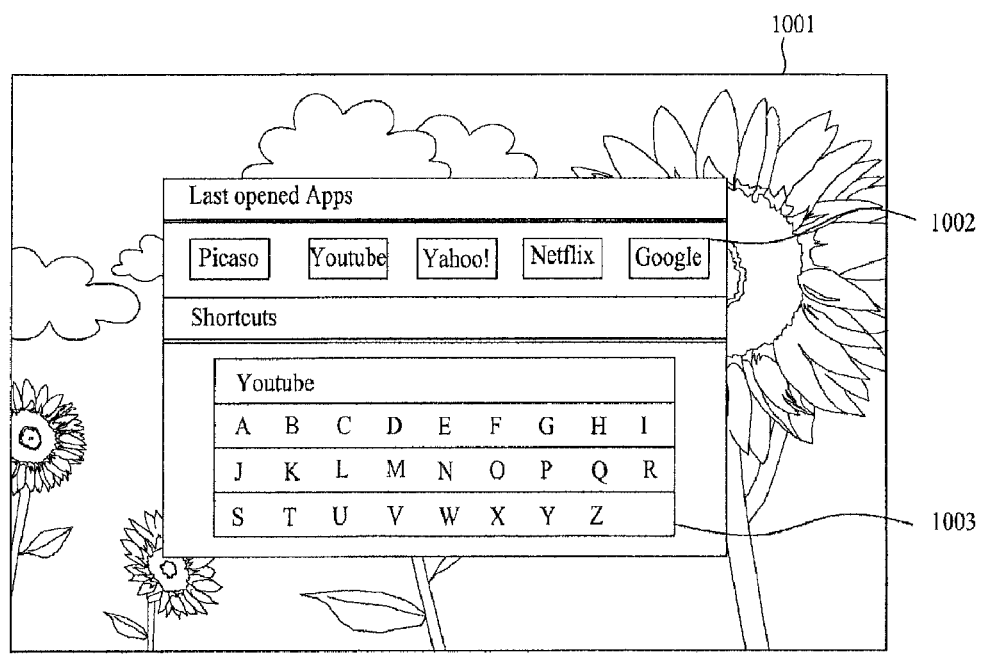
FIG. 10 shows a Shortcut menu with a list of applications.

FIG. 10 shows a display screen 1001 including a Shortcut menu that also includes or is simultaneously displayed with a predetermined list of applications. In display screen 1001, the Shortcut menu includes a list of characters 1003 configured in a specific language and a list of predetermined applications. The number of application items and the content of the applications in the list of predetermined applications may vary, for example, depending upon the frequency of usage, recent usage, and/or user selection of the application. The user interface, therefore, enables the user to execute the most frequently used applications and the most recently used applications with more convenience.

Figure 11:
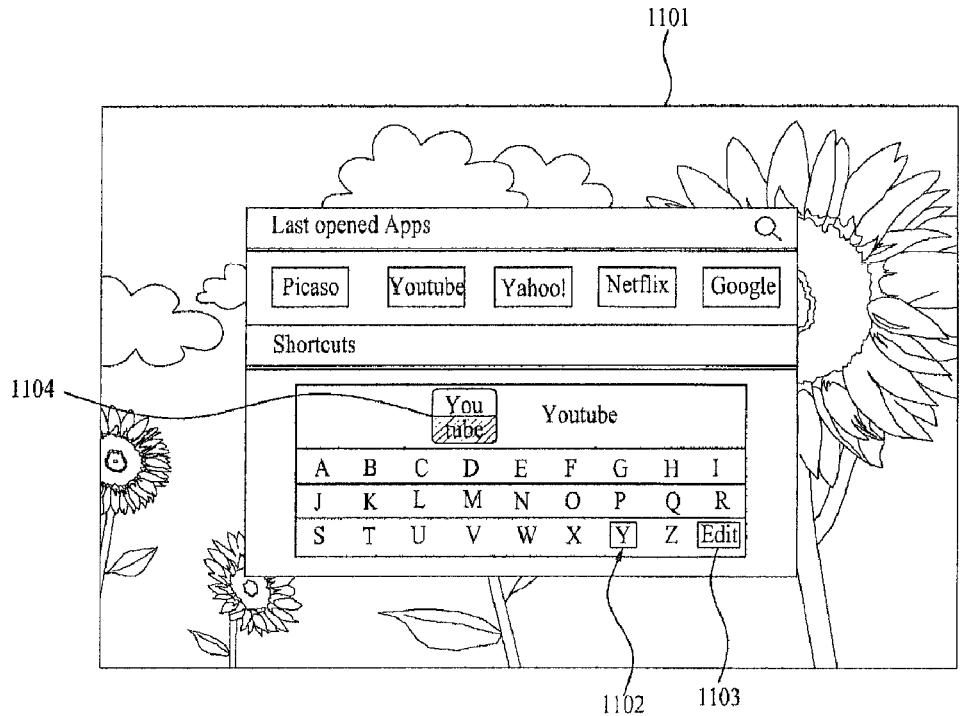
FIG. 11 shows a screen including a Shortcut menu having a Shortcut Edit menu item and a Character (or Letter) Select block.

FIG. 11 shows a display screen 1101 including a shortcut menu having a Shortcut Edit menu item and a Character (or Letter) Select block. The display screen 1101 may display Shortcut Edit menu items with a separate menu item as shown, or among the list of specific characters of the Shortcut menu. A Select signal of a specific character that is not set up as a shortcut object may be recognized as the Shortcut Edit signal.

The Shortcut menu may include a selection block 1102 displayed in the form of a selection block for selecting a specific character from the list of characters. The selection block may be output, for example, in the form of a selection cursor.

The user may move (or shift) the selection block 1102 using a user input device, such as a remote controller. Furthermore, a user interface of a Shortcut menu including a menu item 1104 may be outputted. Herein, the menu item 1104 indicates the Shortcut that is set up with respect to a specific character where the selection block is currently located. The menu item 1104, which indicates the shortcut that is set up to the specific character, may include at least one of the name of a shortcut target and the icon of a shortcut target.

Figure 12:
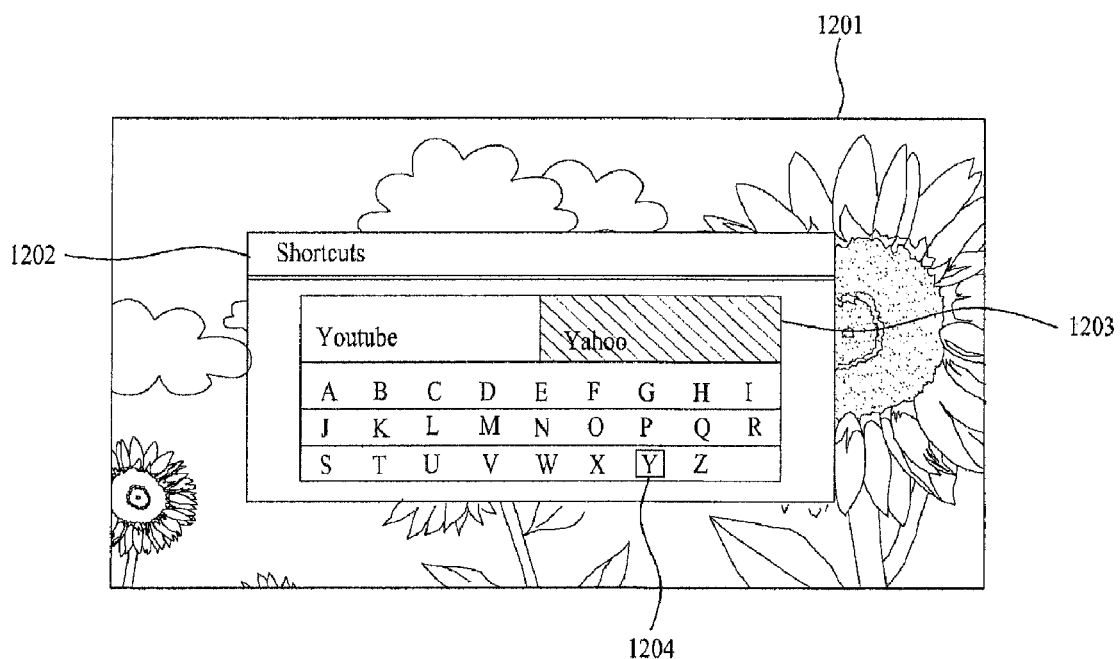
FIG. 12 shows a Shortcut Select menu with a list of applications.

FIG. 12 shows a display screen 1201 including a Shortcut Select menu having a predetermined list of applications. When multiple shortcuts are set up to a specific character included in the Shortcut menu, FIG. 12 illustrates a user interface of a Shortcut menu 1202 including a Shortcut Select menu 1203.

Because various applications and functions exist in the image display device, at least one or more shortcut targets may be set up with respect to one shortcut object. For example, when the letter is selected from the list of characters through the Selection block 1204 of the Shortcut menu 1202, a Shortcut Select menu 1203 for selecting at least any one of the shortcut targets Youtube or Yahoo, which correspond to the shortcuts selected for is displayed.

By using the above-described user interface, even when multiple shortcuts are set up for one specific character (or letter), the user may be capable of easily recognizing the multiple shortcuts and of conveniently selecting a wanted shortcut.

Figure 13:
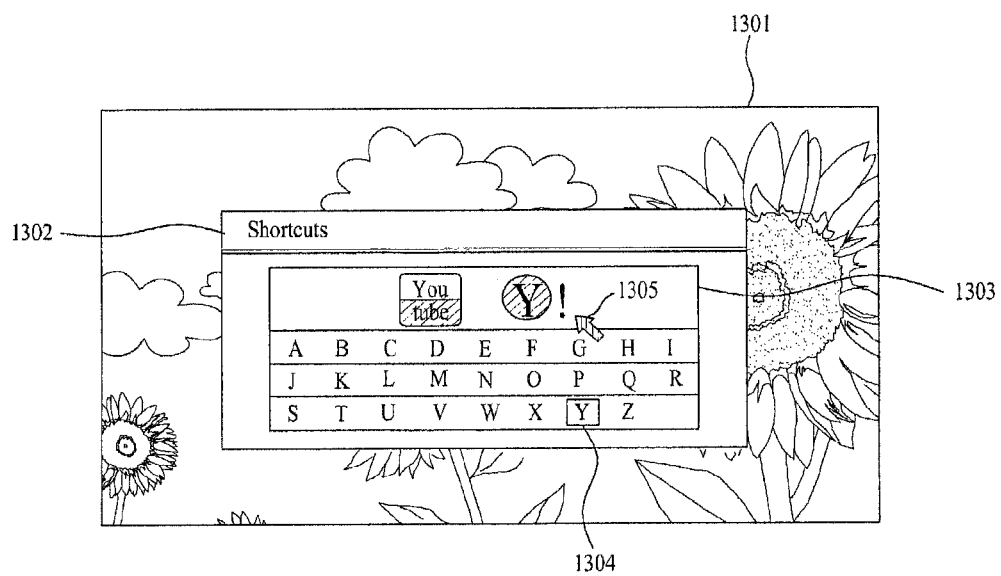
FIG. 13 shows a Shortcut Select menu with a list of applications.

FIG. 13 show another display screen 1301 including a Shortcut Select menu including a predetermined list of applications. Herein, a Shortcut menu 1302, a Shortcut Select menu 1303, and a character selection block 1304 may be collectively displayed on the display screen 1301 as the user interface. This is identical to the example given in FIG. 12.

However, unlike the example shown in FIG. 12, the Shortcut Select menu 1303 may display the multiple shortcuts, which are set up with respect to a specific character selected by the selection block, in the form of predetermined image data corresponding to the respective shortcuts. Also, the Shortcut Select menu 1303 may include a selection cursor 1305 for selecting at least one or more shortcuts from the multiple shortcuts. By using the above-described user interface, the user may be capable of intuitively recognizing the types and functions of the multiple shortcuts by referring to the image data.

Figure 14:
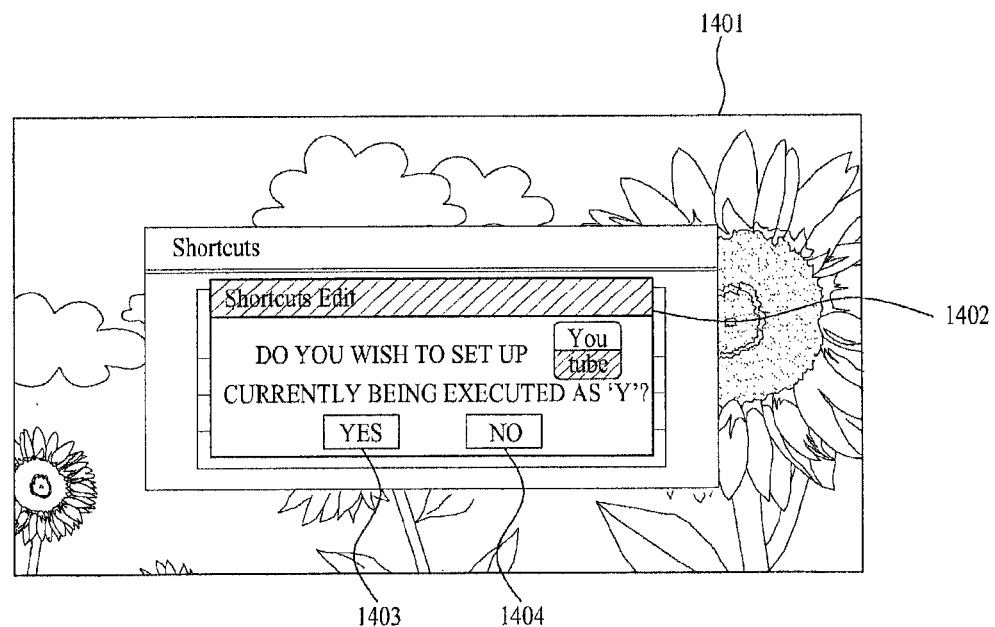
FIG. 14 shows a Shortcut Edit menu with a list of applications.

FIG. 14 shows a display screen 1401 including a Shortcut Edit menu having a predetermined list of applications. The display screen 1401 may include a Shortcut Edit menu 1402. From the Shortcut Edit menu 1402, the user may select whether or not to set up the items, which are currently being executed by the image display device, as the shortcut targets respective to the specifically selected character (or letter).

The Shortcut Edit menu 1402 may include may include predetermined messages or image data respective to the items that are currently being executed by the image display device. Also, when the user selects a 'YES' menu item 1403 through the input means, the image display device updates the shortcut mapping data.

Figures 15, 16:
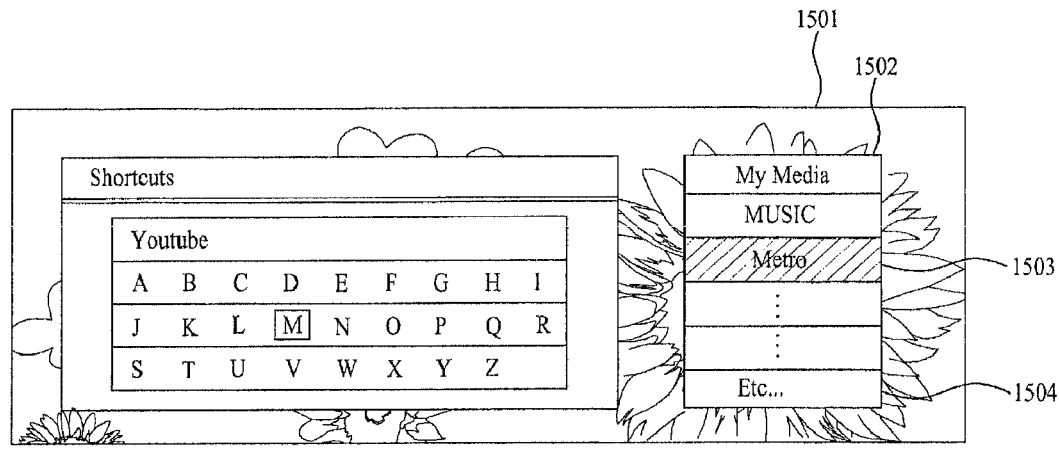
FIG. 15 shows another screen relating to the Shortcut Edit menu.
FIG. 16 shows one embodiment of shortcut mapping data.

Conversely, when the user selects a 'NO' menu item 1404 through the input means, the image display data may output a user interface including a predetermined list for selecting shortcut targets, as shown in FIG. 15.

By using the Shortcut Edit menu 1402, the user may easily designate the items, which are currently being executed by the image display device, as the shortcut target, thereby storing the designated shortcut targets.

FIG. 15 shows another display screen including a Shortcut Edit menu including a predetermined list of applications. In order to map the shortcut objects to the Shortcut Edit menu 1502, the Shortcut Edit menu 1502 being displayed on the display screen 1501 outputs at least any one of the menu items list of the image display device and the list of applications available to the image display device as the user interface.

The menu items list of the image display device and the list of applications available to the image display device may include and output only a list of items associated with the specific character, which is to be set up as the shortcut object by the user. For example, the Shortcut Edit menu 1502, which enables the user to set up the letter 'M' as a shortcut object, may include and output only the items having names starting with 'M', such as 'My Media', 'Music', 'Metro', and so on. In case a wanted item does not exist in the corresponding list, the user may select an 'ETC' item 1504 so as to search another item.

Furthermore, by using the item selection block 1503, the user may select at least one or more menus or application items that are to be set up as shortcuts from the list 1502.

FIG. 16 shows one embodiment of shortcut mapping data stored in a storage device, that is configured to store shortcut mapping data for each shortcut object. For each English letter (or character) 1602, the shortcut object may store shortcut menu items 1603 designated to each specific English letter, and may also store application items 1604 designated to each specific English letter. Also, multiple items 1605 may be designated to one specific English letter.

In the user interface of the shortcut menu, in case a shortcut object 1602 is selected by using a user input interface unit of the image display device, mapping data associated with the Designate Shortcut menu items and the Designated Applications items corresponding to the selection information may be transmitted to the controller of the image display device.

Figure 17:
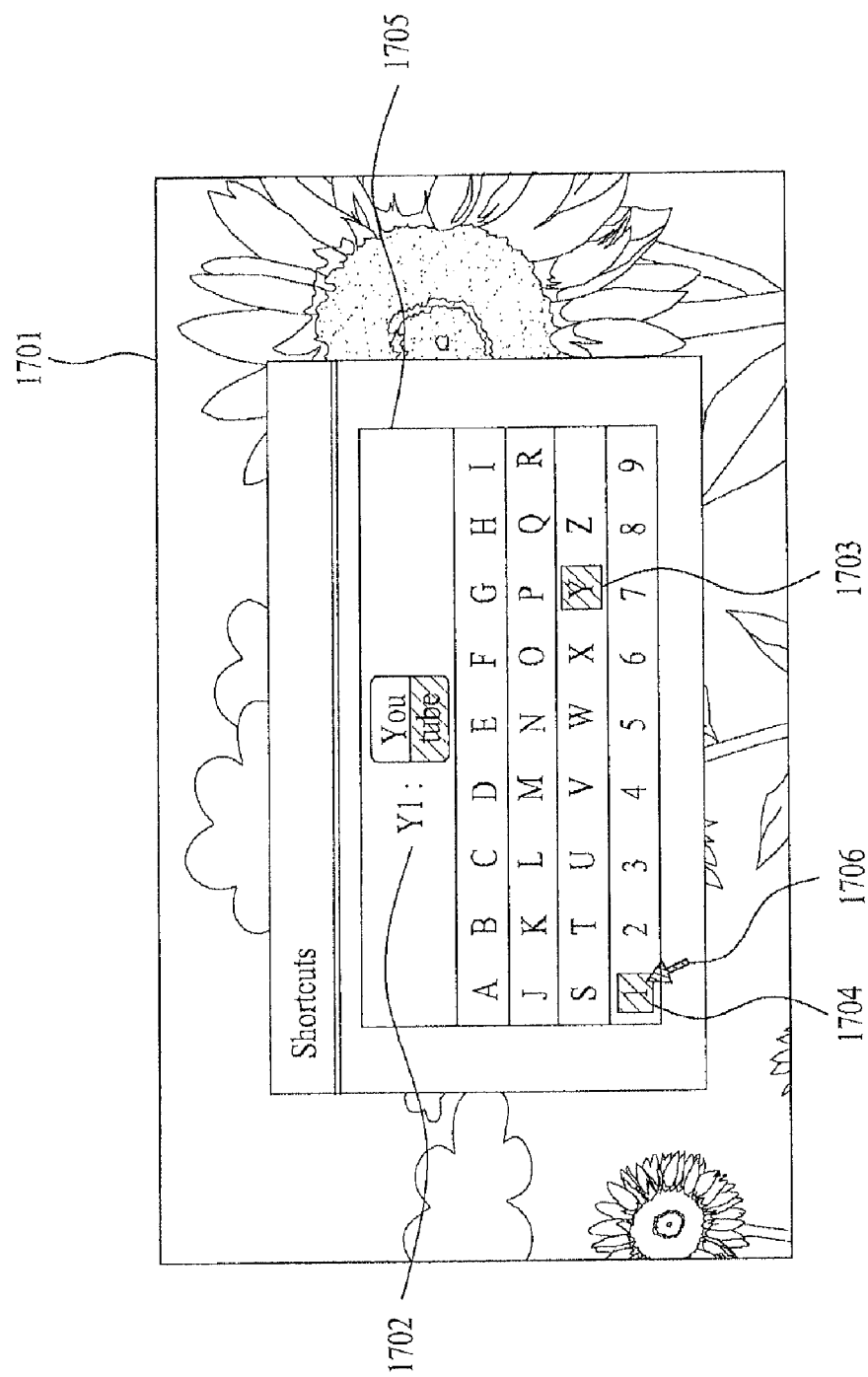
FIG. 17 shows another screen including a Shortcut menu.

FIG. 17 shows another display screen 1701 including a Shortcut menu having a list of characters written in a specific language. More specifically, a menu screen 1705 enables the multiple letters or numbers included in the list of characters to be selected, so that the selected letters can be moved to a specific menu item of the image display device, or so that a specific application can be executed.

A character list of multiple languages or number list may be collectively included, and the shortcut function may be executed by combining the letters or numbers. More specifically, a combination of a specific letter and specific number may be set up as the shortcut object.

While displaying specific contents to the display screen 1701, a Shortcut menu 1705 including a character list of a specific language and a specific number list may be displayed. Furthermore, a pointer 1706 for selecting a specific letter or number included in the Shortcut menu may also be included.

When multiple characters 1703 or numbers 1704 are selected as the shortcut objects by the pointer 1706, the selected 'Y' and '1' are combined, and a shortcut function 1702 having 'Y1' set up as the shortcut object may be executed.

Thus, in this embodiment, when a wide range of functions and applications exists in the image display device, regardless of the number of characters written in a specific language, a variety of letter combinations may be set up and used as the shortcut objects.

Figure 18:
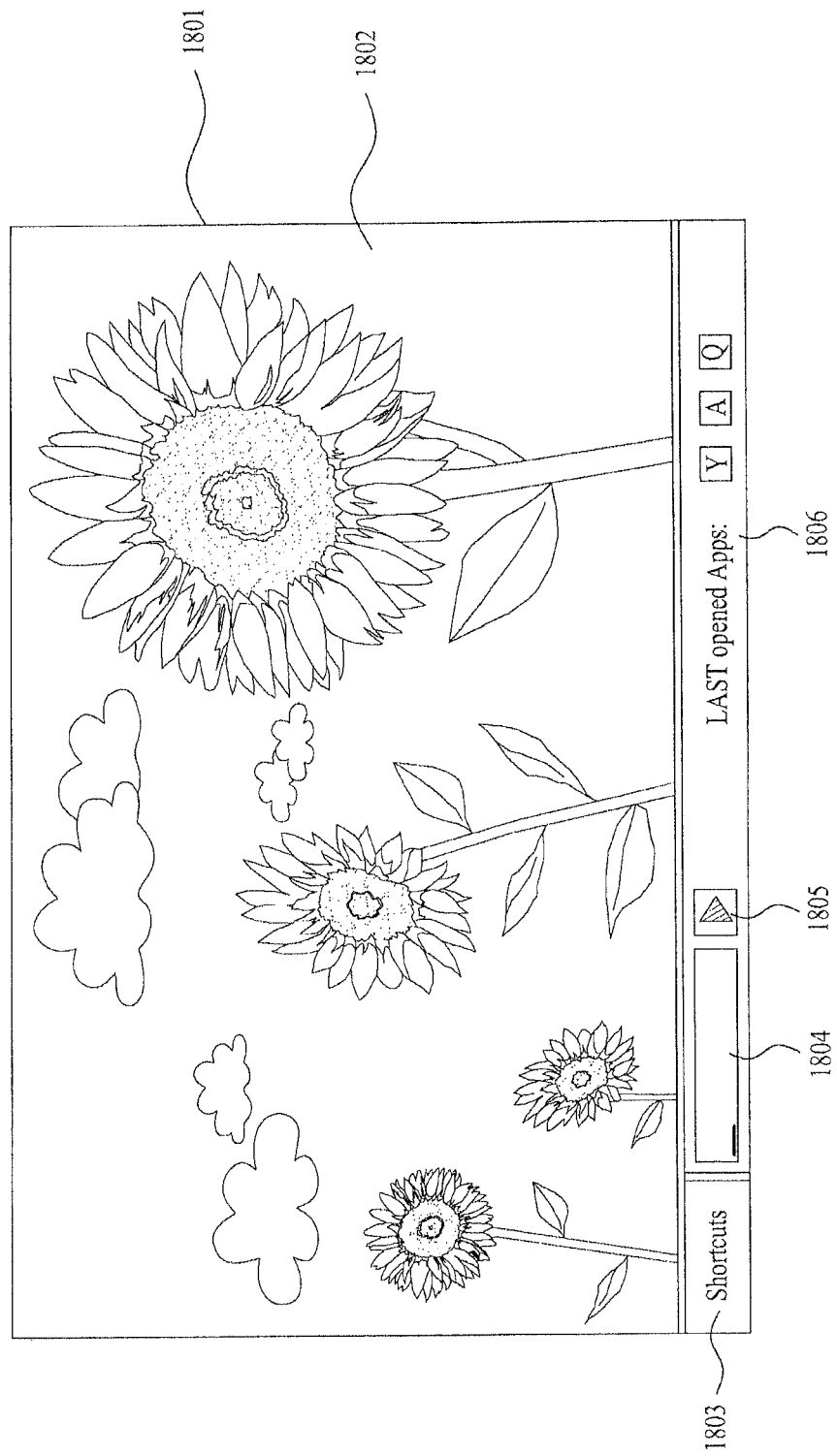
FIG. 18 shows another screen including a Shortcut menu.

FIG. 18 shows a display screen 1801 including a Shortcut menu. When the user is using a specific content 1802 through the display screen of the current image display device, in order to allow the user to easily use the corresponding content, the size of the Shortcut menu 1803 may be minimized and displayed. More specifically, without including the list of characters written in a specific language in the Shortcut menu, a Shortcut menu 1803 including only a character input window 1804 for inputting a specific character that is set up as the shortcut object may be displayed.

By inputting the specific character in the character input window 1804 with the use of a particular user input device (UID), and by selecting an Execute Menu item 1805, the user may execute a specific shortcut function having the inputted character set up as the shortcut object.

Furthermore, the Shortcut menu 1803 may include a specific list of applications 1806. The list of applications may include most recently executed applications, most frequently executed applications, or applications set up by the user. Additionally, although the list of applications 1806 may include specific image data respective to the applications included in the list of applications, in order to minimize the size of the Shortcut menu 1803, only the specific character that is set up as the shortcut object of the corresponding application may be included in the list of applications 1806 so as to be displayed.

Figure 19:
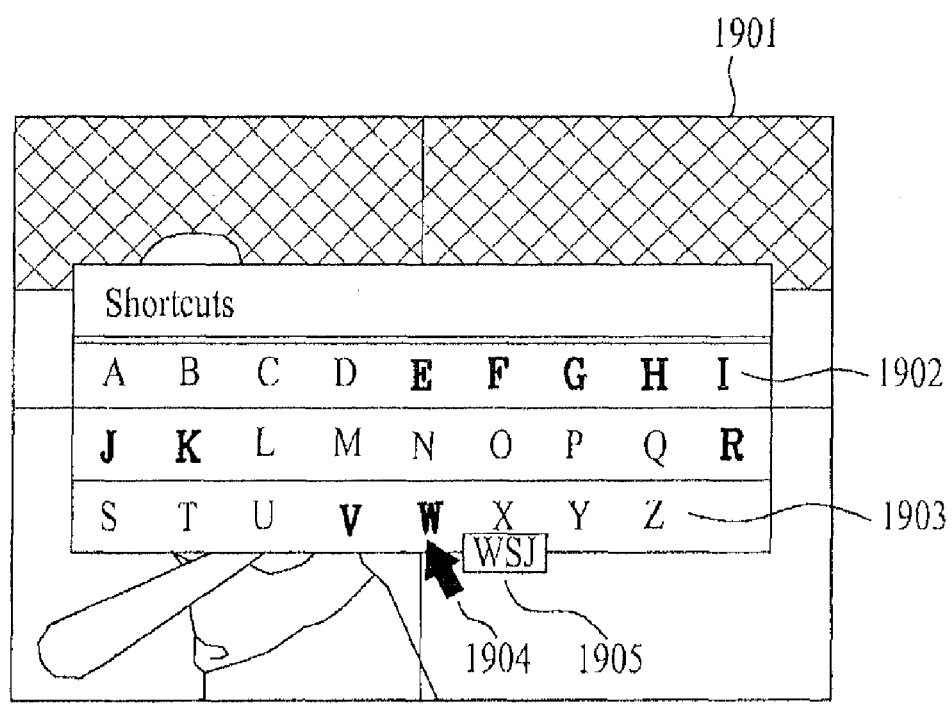
FIG. 19 shows a screen including a menu for use in accessing shortcuts.

FIG. 19 shows a display screen 1901 having a Shortcut menu which includes a list of characters written in a specific language. The list may differentiate the characters (or letters) set up as shortcut objects 1902 from the characters (or letters) that are not set up as shortcut objects 1903, and the corresponding characters 1902 and 1903 may be marked differently. This is may be performed in a manner similar to the example shown in FIG. 9.

The Shortcut menu may include a pointer 1904 for selecting a shortcut object. When the pointer is placed over a character that is set up as a specific shortcut object, information 1905 associated with the shortcut function having the character pointed by the pointer set up as the respective shortcut object may be automatically displayed. For example, in case the letter 'W' corresponds to the character that is set up as the shortcut object, and in case the pointer 1904 is placed over the letter 'W', information associated with the 'WSJ (i.e., Wall Street Journal)' application, which corresponds to the shortcut function set up for 'W', may be displayed.

Thus, in this embodiment, not only character information but also image data corresponding to the shortcut function set up as described above may be displayed. Furthermore, in case the pointer 1904 remains stable (or untouched) over the specific character for over a predetermined period of time, settings may be made so that in such case the respective information can be displayed. Accordingly, the user may be capable of recognizing or identifying the shortcut function set up for a specific character more conveniently.

Figure 20:
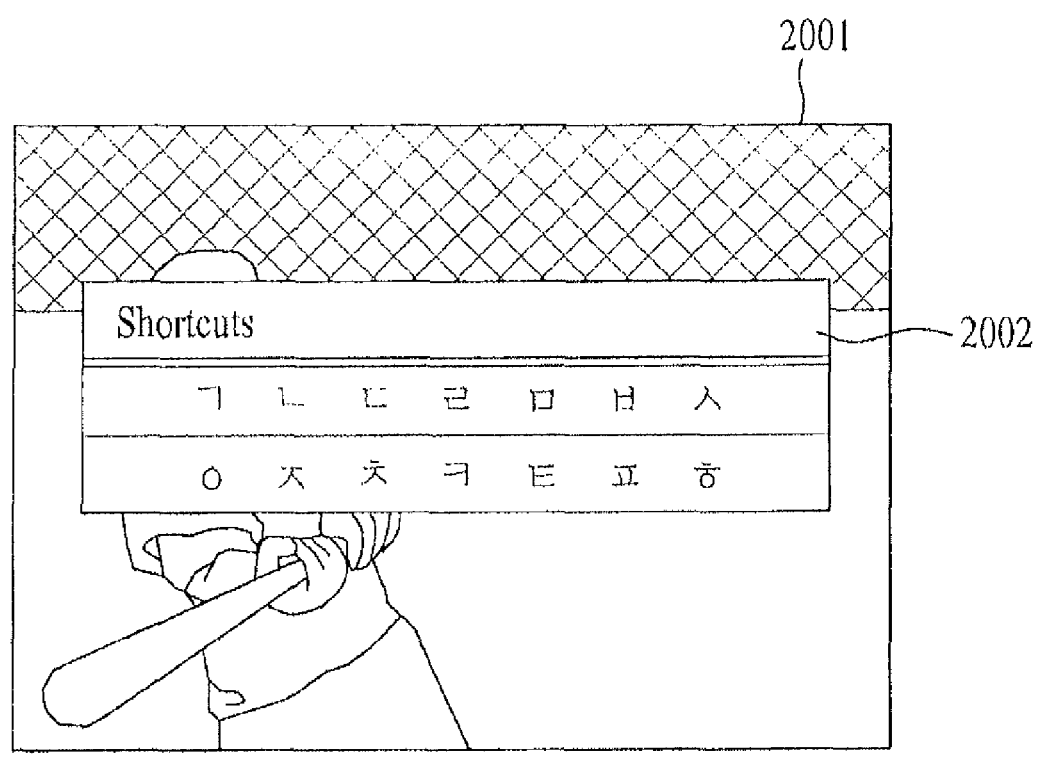
FIG. 20 shows another screen including a Shortcut menu.

FIG. 20 shows a display screen 2001 including a Shortcut menu 2002 which includes a list of characters (or letters) written in a specific language. For illustrative purposes, the Shortcut menu 2002 may include a list of Korean characters.

For example, the list may include Korean initial consonants starting from 'ㄱ' to 'ㅎ'. Alternatively, although not shown, vowels may be shown and/or further included in the list. By combining one of the consonants and one of the vowels, a specific character that is set up as the shortcut object may be inputted so as to execute the shortcut function.

Furthermore, as described above, it is apparent that the list of characters may vary depending upon the language spoken by the user. Accordingly, when a Korean-speaking user executes the above-described shortcut function by using the image display device, the user may be capable of using the shortcut function according to the present invention more conveniently.

Figure 21:
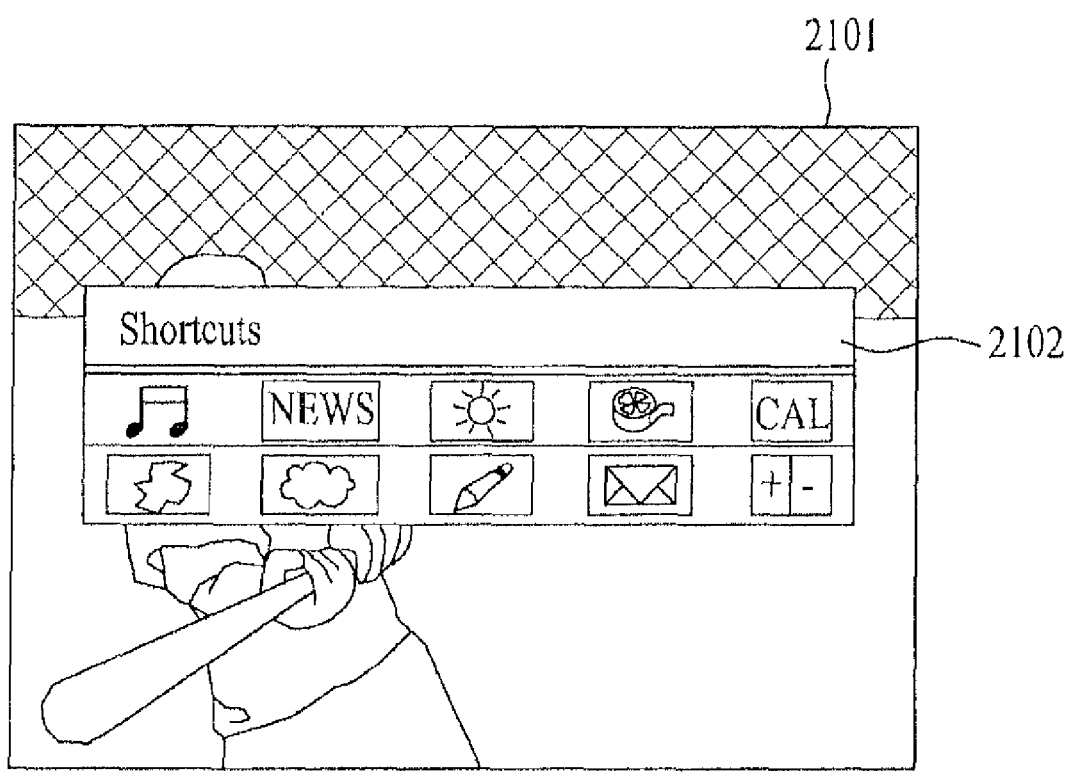
FIG. 21 shows another screen including a Shortcut menu.

FIG. 21 shows a display screen 2101 including a Shortcut menu 2102 having specific emoticons instead of a list of characters written is a specific language.

For example, emoticons such as '♪', '☎', '|CAL|', and so on, may be included in the Shortcut menu so as to be used as respective Shortcut objects. The emoticons may be directly input by the user, and in addition to the characters of a specific spoken language, symbols or iconic characters may also be included in the input emoticons.

By setting up the above-described emoticons as shortcut objects, the user further may be capable of intuitively recognizing and identifying shortcut functions set up for the respective shortcut objects.

Figure 22:
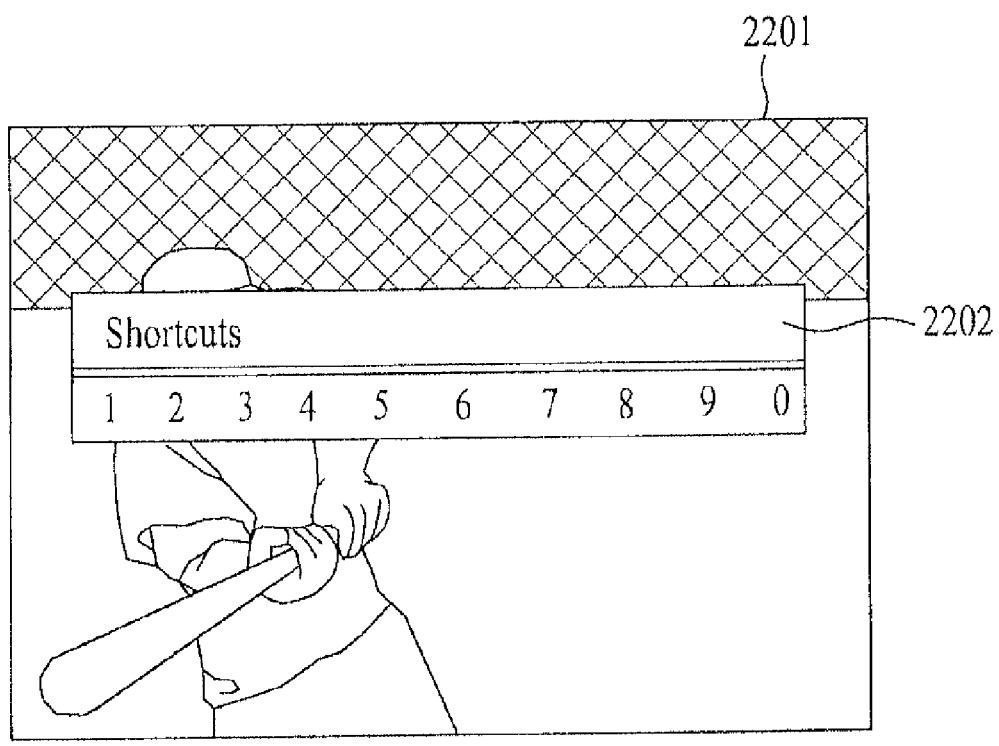
FIG. 22 shows another screen with a menu for use in accessing shortcuts.

FIG. 22 shows a display screen 2201 including a Shortcut menu 2202 that includes only a list of specific numbers. For example, Shortcut menu 2202 may include a list of numbers starting from '0' to '9'. By assigning a respective number to each function or application of the image display device, the list of numbers may include all of the assigned numbers and be displayed.

Also, as shown, the Shortcut list may include only list of the numbers from '0' to '9', and the shortcut function may be executed by a combination of at least one or more of the listed numbers.

Figure 23:
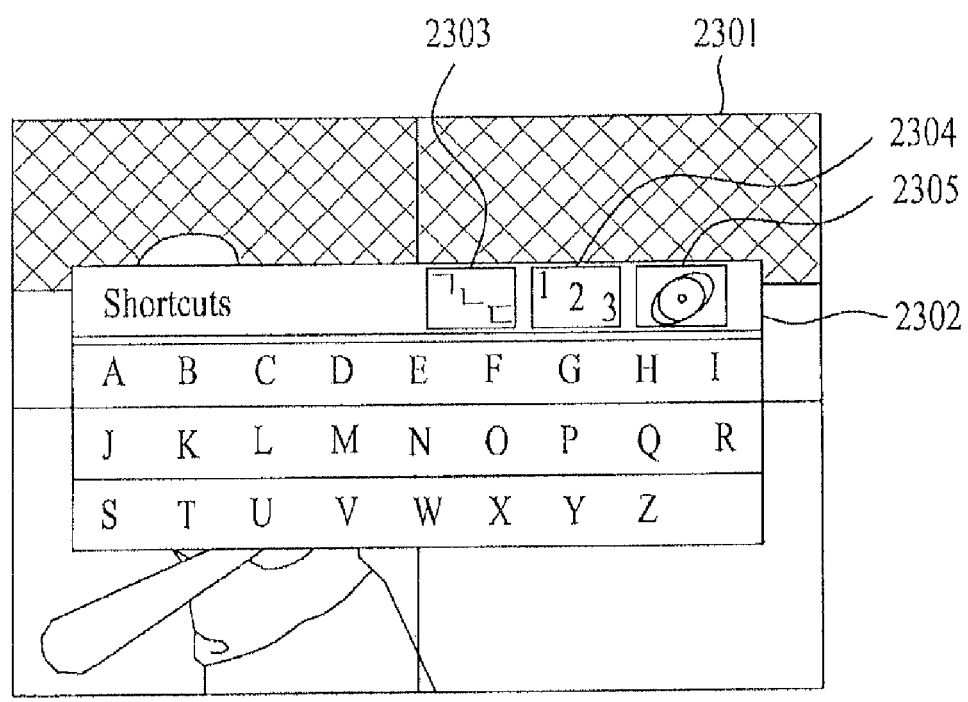
FIG. 23 shows another screen with a Shortcut menu.

FIG. 23 shows a display screen 2301 including a Shortcut menu 2302 having a list of characters written in a specific language. The characters are displayed with menu items 2303, 2304, and 2305 for shifting the list of characters. For example, in case a list of English alphabets is included in the Shortcut menu, the Shortcut menu 2302 may include a menu item 2303 for shifting the list of characters to a list of Korean characters, a menu item 2304 for shifting the list of characters to a list of numbers, and a menu item 2305 for shifting the list of characters to a list of emoticons may be included.

When the menu item 2303 for shifting the list of characters to a list of Korean characters is selected from the Shortcut Menu screen, as shown in FIG. 23, a Shortcut menu including the list of Korean characters shown in FIG. 20 may be displayed. More specifically, by selecting the respective menu items, the user may be capable of easily shifting the list of characters, thereby being capable of executing the wanted Shortcut function.

Figure 24:
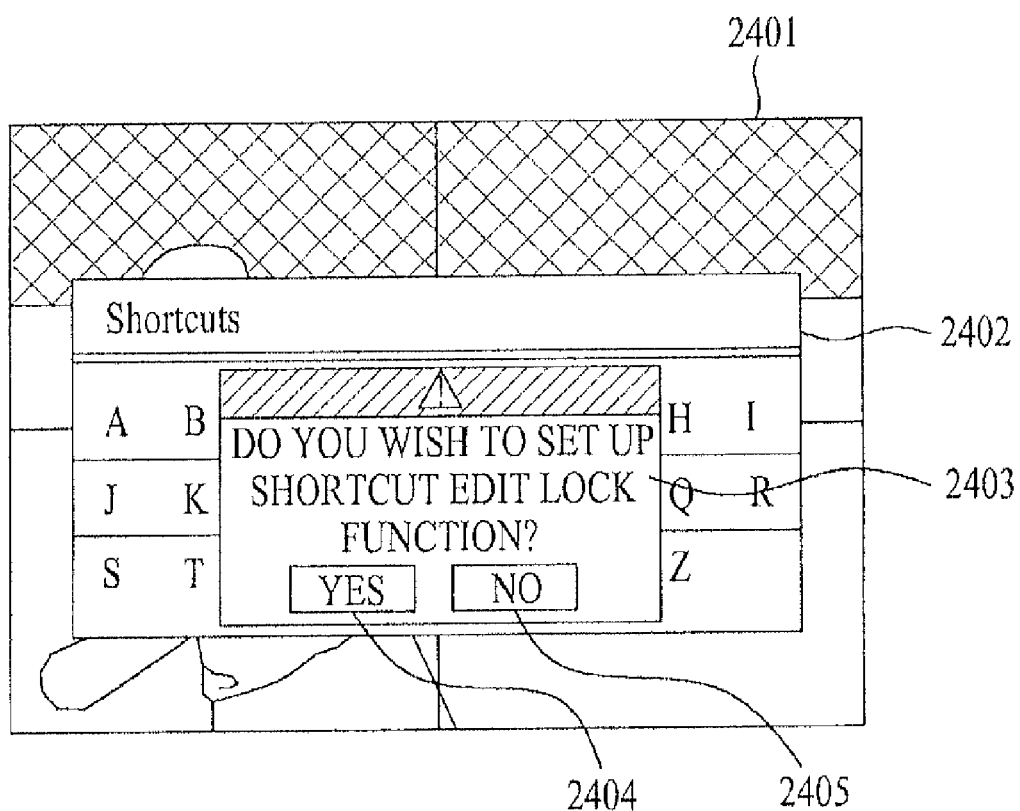
FIG. 24 shows a screen including a Shortcut Edit Lock menu.

FIG. 24 shows a display screen 2401 including a Shortcut Edit Lock menu, where settings may be made in the image display device so that the process of editing the predetermined Shortcut can be limited (or restricted). For example, in case a first user sets up a Shortcut in the image display device and stores the setup information, limitations may be applied to a second or third user for adding or deleting shortcuts to or from the shortcut preset by the first user.

In case an Edit Lock menu item is selected from the Shortcut menu of the image display device, or in case a Hot Key of a remote controller is activated, a menu screen 2403 for setting up the Shortcut Lock function may be displayed. In case an 'OK' menu item 2404 is selected from the menu screen, the image display device may output a Password input menu for setting up a password in order to disable the Lock function. Furthermore, although it is not shown in FIG. 24, the menu screen may include a password input window for setting up the password.

Accordingly, even when multiple users use the same image display device, if one specific user has set up the Shortcuts, the corresponding user may protect all information associated with the preset Shortcuts.

Figure 25:
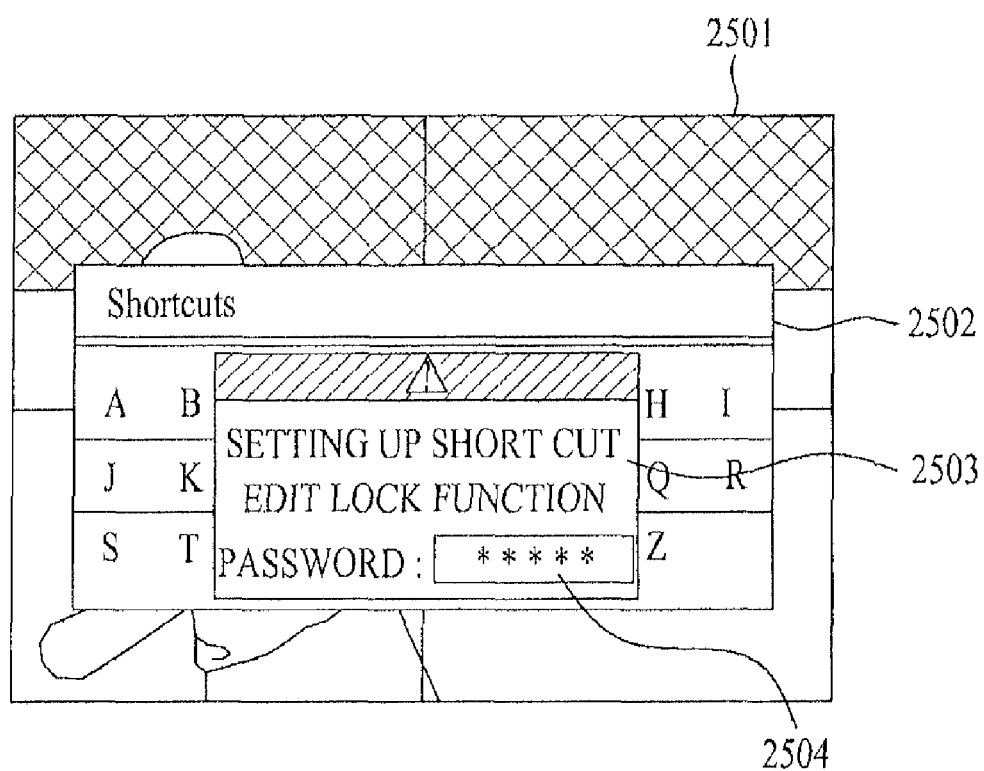
FIG. 25 shows a screen including a Shortcut Edit Disable menu.

FIG. 25 shows a display screen 2501 including a Shortcut Edit Disable menu. In case the Shortcut Edit Lock mode is set up in the image display device, when the user inputs a specific signal for editing the Shortcuts to the image display device, a menu screen for disabling the Lock function may be outputted. The specific signal may include a Select signal of a Shortcut Edit Menu item or a Hot Key Input signal of a remote controller.

Shortcut menu 2502 is displayed on the display screen 2501 of the image display device, and a password input window 2503 may be displayed. Herein, the password input window 2503 is used for verifying a password pre-stored when the user inputted a signal for editing a specific Shortcut in an earlier process.

When the user inputs a password by using a specific user input device, or when the user inputs a specific password by using an on-screen keyboard, and when the password matches the pre-stored password, the Shortcut Edit Lock function may be disabled, and the Shortcut Edit Menu screen may be displayed.

Figure 26:
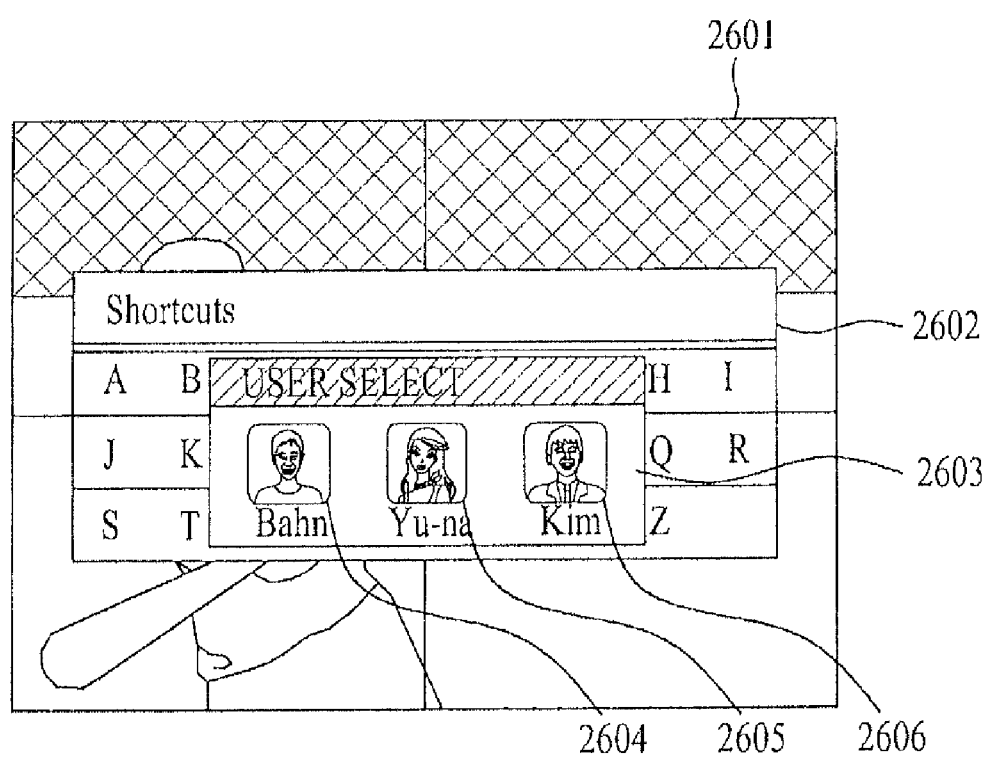
FIG. 26 shows a menu for use in setting shortcuts for different users.

FIG. 26 shows a display screen 2601 including different Shortcut menus set up for each of a plurality of users. When multiple users share the same image display device, different Shortcut menus may be set up each user. By selecting a specific menu item from the image display device or by activating a Hot Key, the user of the image display device may be changed.

The image display device may include a Change User menu 2603 for changing user-specific Shortcut menus 2602 within the display screen 2601. The Change User menu 2603 may be displayed along with the Shortcut menu 2602, as shown in FIG. 26. Alternatively, only the Change User menu 2603 may be separately displayed.

Also, the Change User menu 2602 may include information for identifying each user 2604, 2605, and 2606. More specifically, the Change User menu 2602 may include at least one or more of text data and image data associated with the user's name, the user's avatar, and so on, thereby being displayed.

Accordingly, even when multiple users share a single image display device, since a user-specific Shortcut menu can be uniquely set up for each user, the convenience provided to the users may be enhanced.

Figure 27:
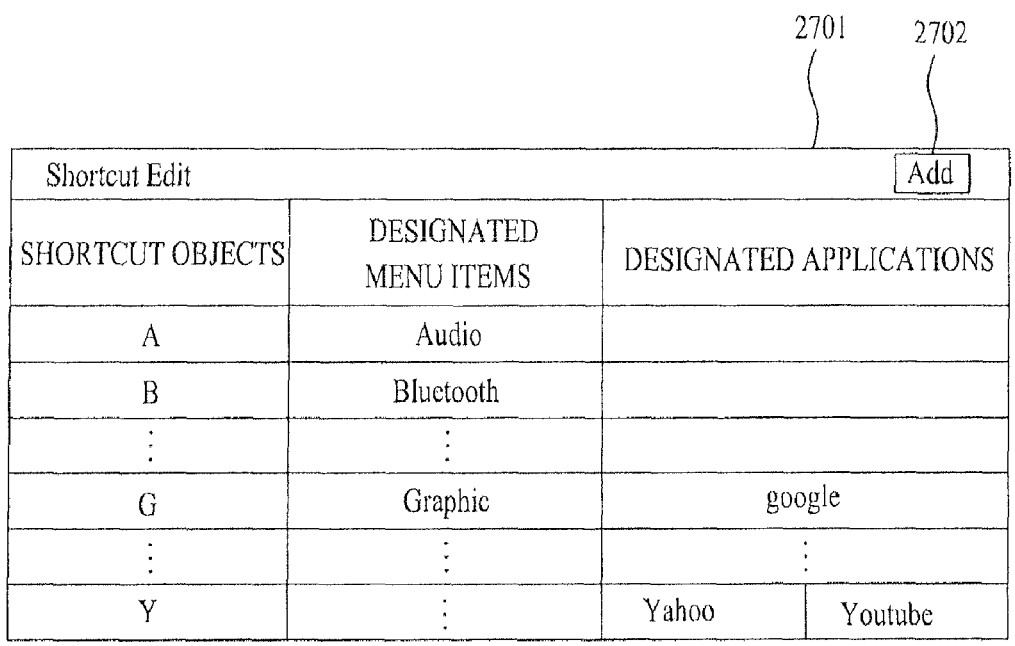
FIG. 27 shows a screen including a Shortcut Edit menu.

FIG. 27 shows a display screen including a Shortcut Edit menu which includes information associated with Designated Menu Items and Designated Applications set up for each Shortcut object. Referring to FIG. 27, when each alphabet letter of the English language is set up as a respective Shortcut object, the Shortcut Edit menu 2701 may include a data table that allows the user to identify the menu item or application to which each letter of the English alphabet is designated.

For example, by using the data table of FIG. 27, the user may be able to know (or recognize) that the letter 'G' is set up as a shortcut object, and that a 'Graphic' menu item for adjusting the output screen of the image display device and a 'Google' application are designated. Furthermore, a menu item 2702 for adding a specific shortcut function may be included in the data table. Accordingly, the user may be capable of intuitively recognizing which menu item or application is designated to which shortcut object.

Figure 28:
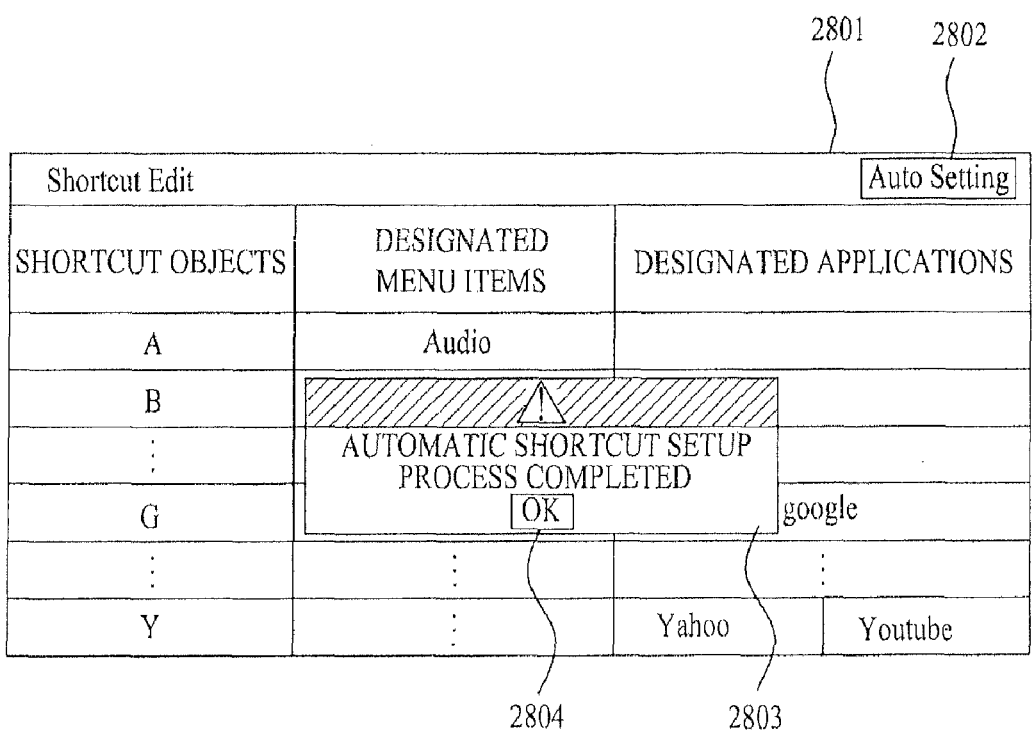
FIG. 28 shows a screen including a Shortcut Automatic Setup Menu.

FIG. 28 shows a display screen including a Shortcut Automatic Setup Menu screen. When setting up a shortcut in the image display device, settings may be made so that an adequate shortcut function can be set up for each shortcut object within the image display device.

For example, in case a list of English alphabet is used as the shortcut objects, and when a specific letter of the English alphabet matches the first letter in the name of a specific menu item or application, the corresponding letter of the list may be automatically mapped to the corresponding menu item or application.

The Shortcut Edit menu 2801 may include a menu item 2802 for automatically setting up shortcuts. When a Select signal of the menu item 2802 is received from the user, the image display device may designate an 'Audio' menu to the shortcut object 'A' and may also designate a 'Google' application to the shortcut object 'G'.

Once the designation of each shortcut function to the respective shortcut object is completed, a menu screen 2803 for storing the shortcut mapping data may be displayed. Also, when an 'OK' 2804 command is input by the user, the shortcut mapping data are updated. And, when a cancel command is inputted, the Shortcut Edit menu prior to processing the Automatic Shortcut Settings may be displayed.

Accordingly, in case a variety of menu items and applications exist in the image display device, the user convenience may be enhanced so that shortcut settings may be performed more easily.

Figure 29:
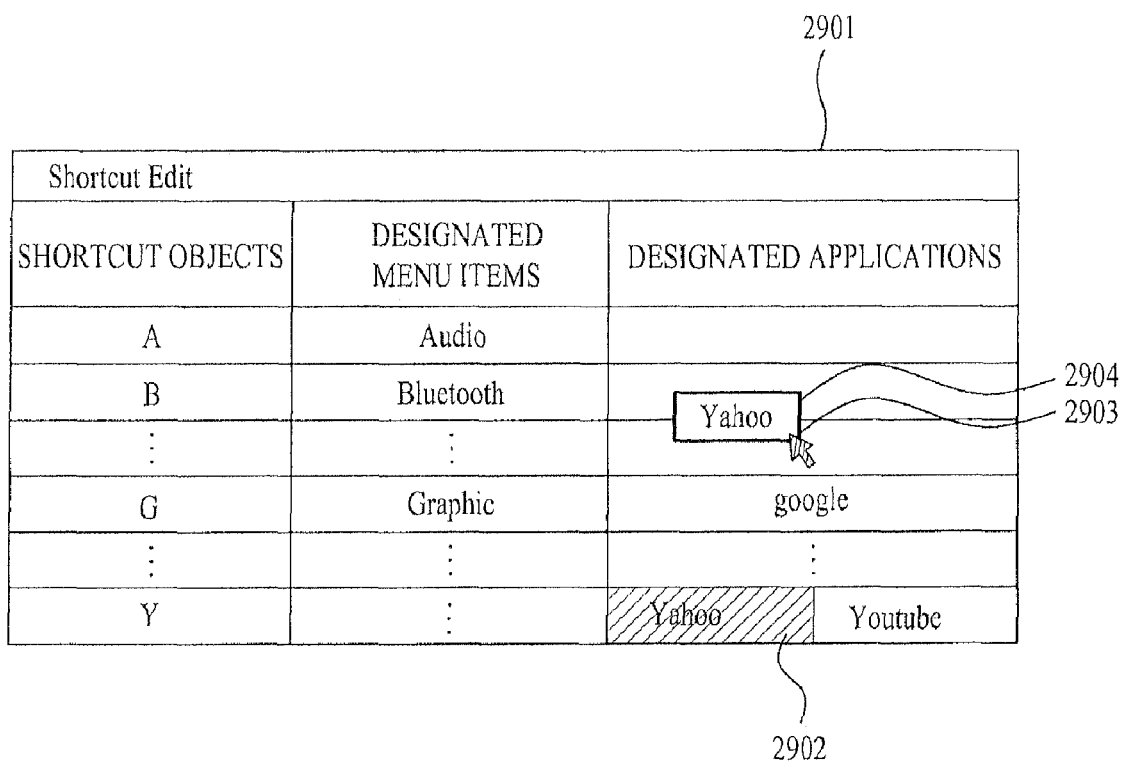
FIG. 29 shows a screen associated with a shortcut editing method.

FIG. 29 shows a display screen associated with a shortcut editing method, and more specifically one which includes a Shortcut Edit menu that provides a Shortcut Edit function by performing Drag & Drop operations using a pointer.

The Shortcut Edit menu 2901 may include a specific pointer 2903. Herein, when the user inputs a Move signal and a Select signal by using the user input device (UID), the pointer 2903 may perform the Drag & Drop operations.

For example, regarding a 'Yahoo' application designated to a shortcut object in case the user seeks to setup the shortcut object as another letter of the English alphabet instead of the name (Yahoo) 2902 of the 'Yahoo' application, which is marked in the data table of the Shortcut Edit menu 2901, is dragged. And, by dropping the dragged name 2904 of the 'Yahoo' application on the row including the wanted shortcut object, the shortcut object of the 'Yahoo' application may be changed. Accordingly, the user may capable of directly editing a specific shortcut.

Figure 30:
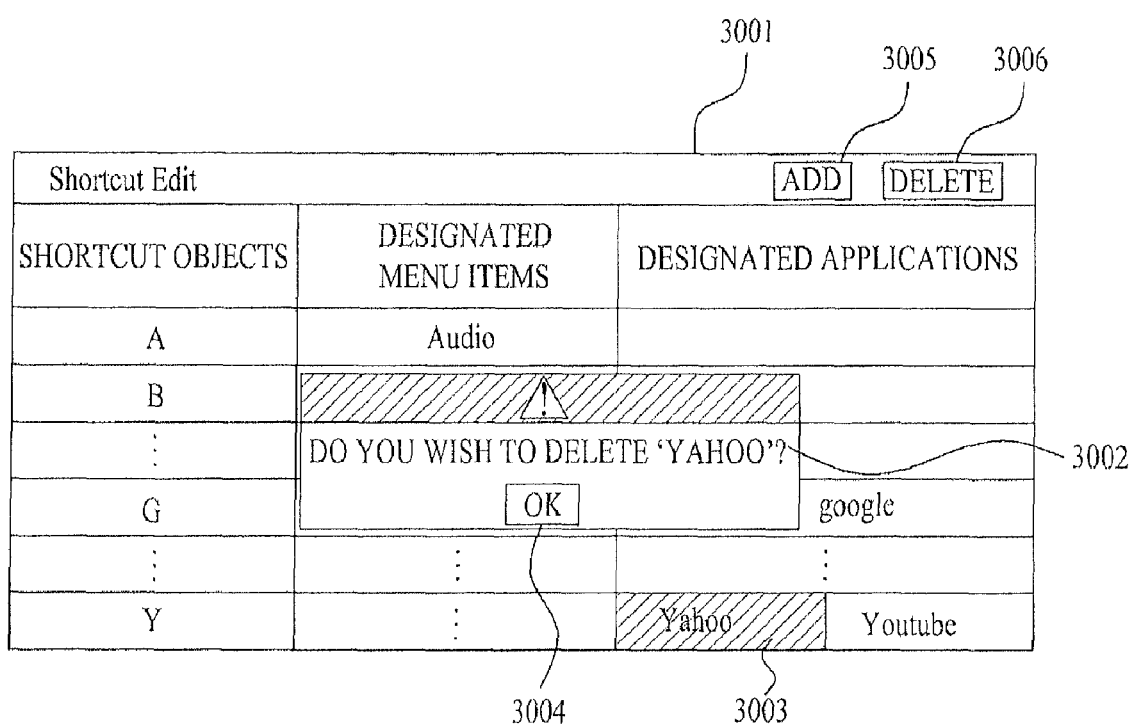
FIG. 30 shows a screen associated with a shortcut editing method.

FIG. 30 shows a display screen associated with a shortcut editing method. In this screen, a specific shortcut function may be deleted from a Shortcut Edit menu 3001. The Shortcut Edit menu 3001 may include a menu item 3005 for adding a shortcut function and a menu item 3006 for deleting a shortcut function.

When a specific designated menu item or designated application is selected by the user, and when the menu item 3006 is selected or a Hot Key Input signal is received, a menu 3002 for deleting the selected 'Yahoo' application 3003 may be displayed.

Furthermore, when an 'OK' 3004 command is inputted by the user, the Shortcut mapping data of the image display device are updated, and the selected 'Yahoo' application may be deleted from the data table of the Shortcut Edit menu. Accordingly, the user may be capable of conveniently editing a specific shortcut function from the Shortcut Edit menu screen.

Figure 31:
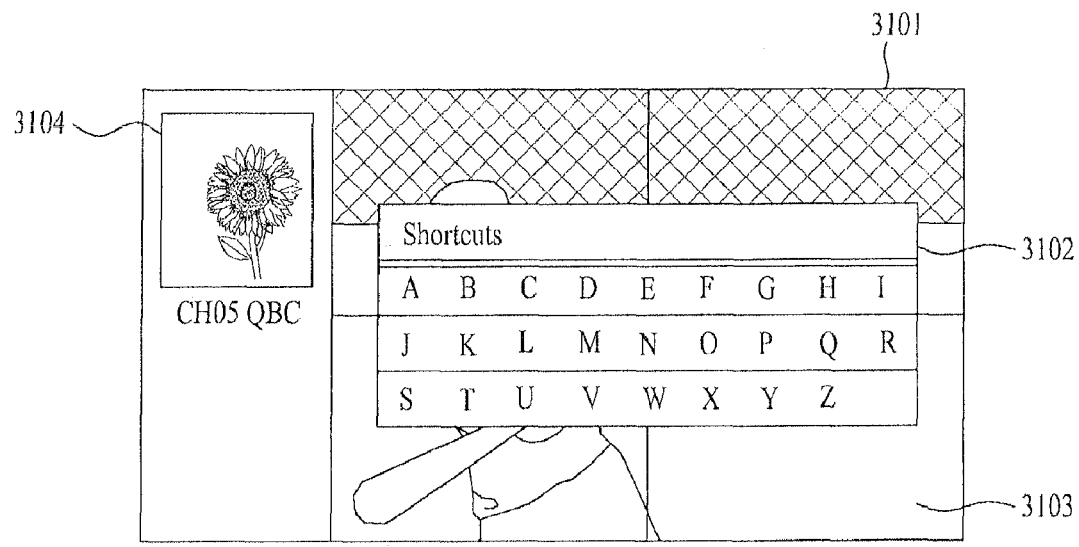
FIG. 31 shows another screen including a Shortcut menu.

FIG. 31 shows a display screen 3101 including a Shortcut menu. While specific content is being used or viewed in the image display device, when a specific shortcut function is executed through a Shortcut menu 3102, a display screen 3103 of the executed shortcut function may be displayed along with the Shortcut menu 3102.

Moreover, a display screen 3104 of the content currently being used or viewed may also be displayed in a predetermined area of the display screen 3101 along with the Shortcut menu 3102. Because the image display device continues to display the display screen 3104 of the content that is currently being used or viewed, even when a specific shortcut function is being executed through the Shortcut menu, the user may be provided with the corresponding content without any interruption.

Figure 32:
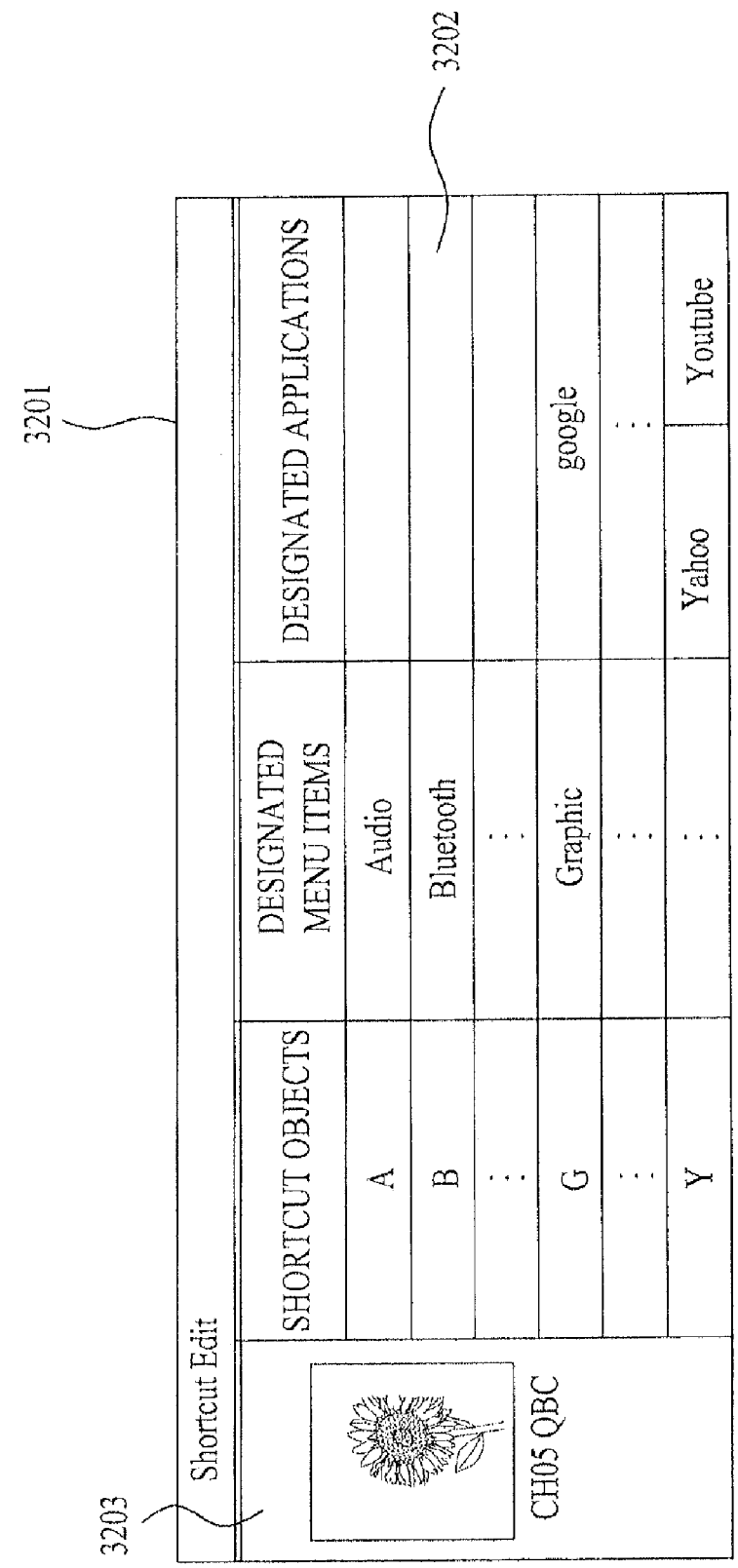
FIG. 32 shows another screen including a Shortcut Edit menu.

FIG. 32 shows a screen including a Shortcut Edit menu. Unlike the example shown in FIG. 31, even when a Shortcut Edit menu 3202 is being displayed, a display screen 3203 of a content that is currently being used in the image display device may be displayed on a predetermined portion of the display screen 3201. Accordingly, just as described in the example shown in FIG. 31, the user may be provided with the content display screen 3203 without any interruption, while editing shortcuts.

Figure 33:
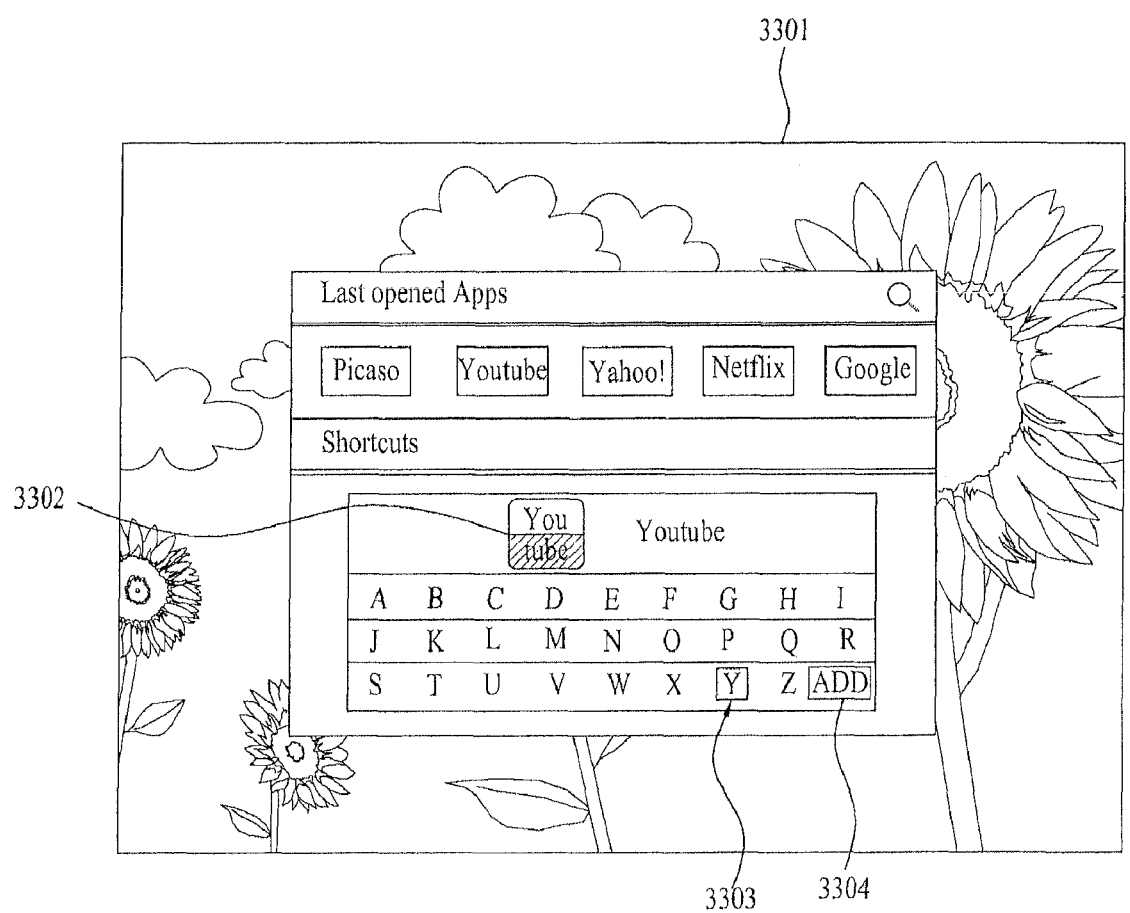
FIG. 33 shows a screen including an Add Shortcut Menu item.

FIG. 33 shows a display screen 3301 including a Shortcut menu having an Add Shortcut Menu item. In addition to a selection block 3303 for selecting a shortcut object and information 3302 associated with the shortcut function designated to the shortcut object selected by the selection block 3303, the Shortcut menu according to the present invention may further include a menu item 3304 for adding shortcut functions. The process of selecting the menu item 3304 in order to edit Shortcuts will now be described in detail with reference to FIG. 34.

Figure 34:
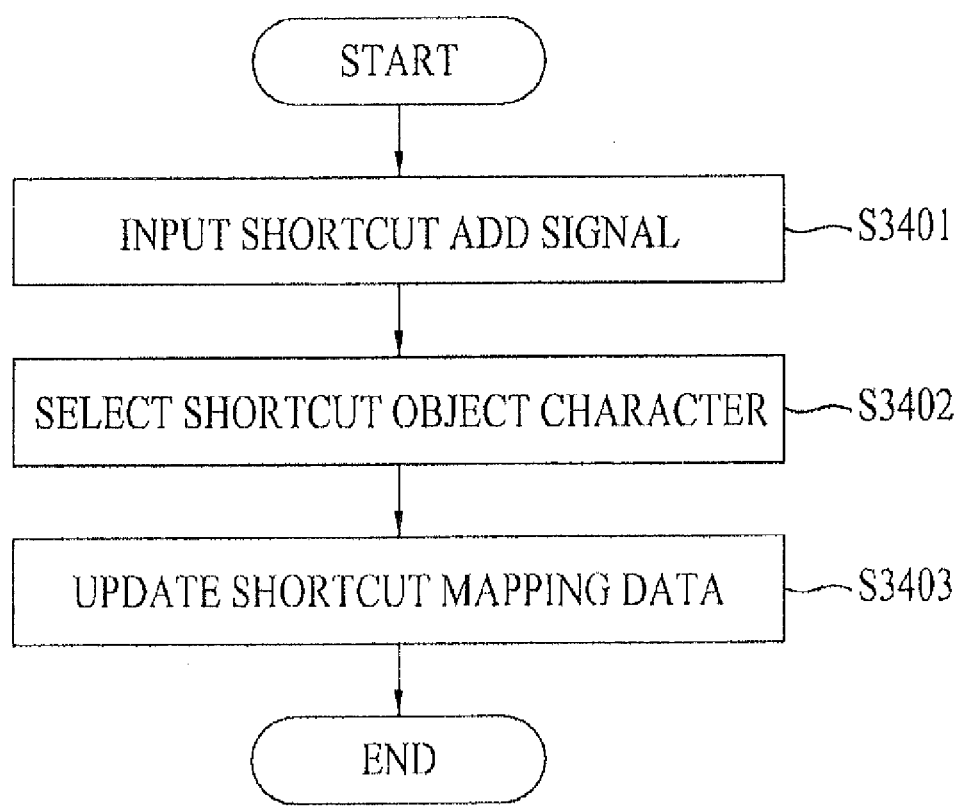
FIG. 34 shows a method for mapping shortcuts to particular content.

FIG. 34 shows one embodiment for mapping shortcuts to particular content. When a specific menu item is being executed in the image display device, or when a specific application is being executed, an Add Shortcut signal is inputted, so as to edit Shortcuts (S3401). The Add Shortcut signal may include a Select signal of the menu item 3304 shown in FIG. 33 or a Hot Key Input signal of a remote controller.

When the Add Shortcut signal is input, the image display device may output a Shortcut menu including a list of characters written in a specific language, and the image display device may receive a Select signal of a specific character from the user so as to select a shortcut object of an application or menu item currently being executed (S3402).

When the Select signal is received, the application or menu item that is currently being used may be mapped to a shortcut object set up with the selected character, thereby updating the Shortcut mapping data (S3403).

Figure 35:
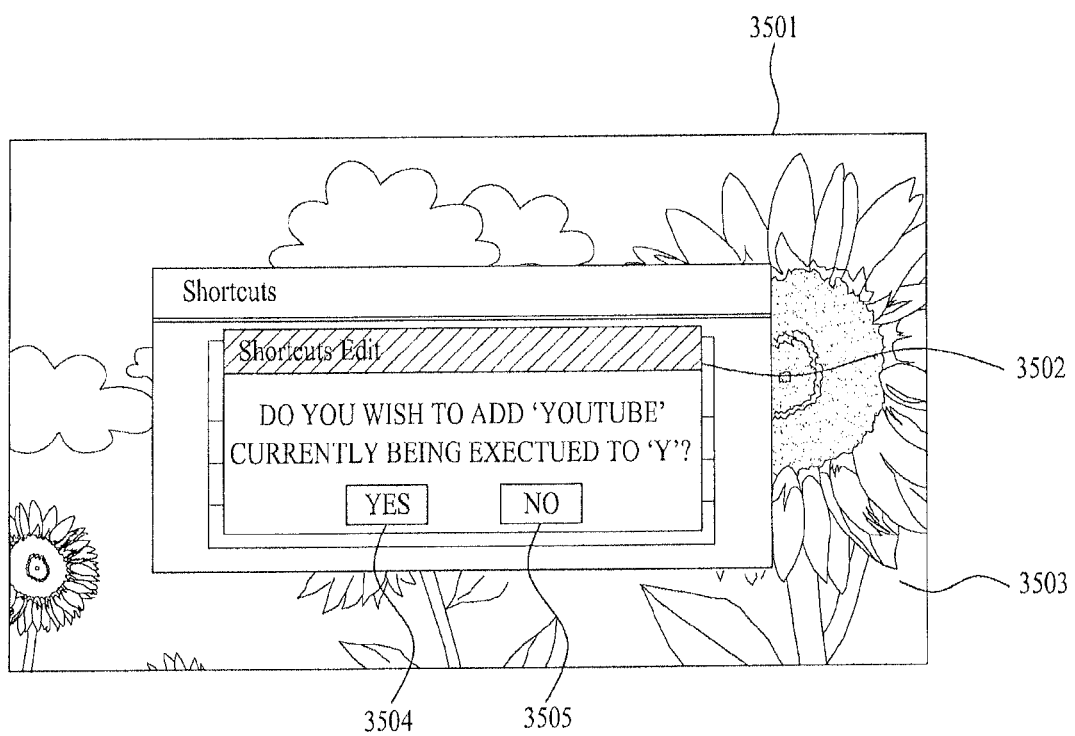
FIG. 35 shows an Add Shortcut Menu screen.

FIG. 35 shows a display screen 3501 including a Shortcut menu having an Add Shortcut Menu. When a Select signal of the shortcut object character (or letter) is received in Step 3402 of FIG. 34, FIG. 35 illustrates an example of a display screen 3501 including a menu 3502 for updating the Shortcut mapping data.

For example, while a 'Youtube' application 3503 is being executed in the image display device, an Add Shortcut signal is inputted. And, when a Shortcut object character is selected, the image display device may map the 'Youtube' application to the letter 'Y', which is set up as the shortcut object. Thus, a menu 3502 for updating the Shortcut mapping data may be displayed.

When a verification (or 'YES') command 3504 is inputted from the menu 3502, the Shortcut mapping data are updated. And, when a cancel (or 'NO') command 3505 is inputted, the corresponding menu 3502 is removed, and the display screen 3503 of the application that is currently being executed may continue to be displayed.

Figure 36:
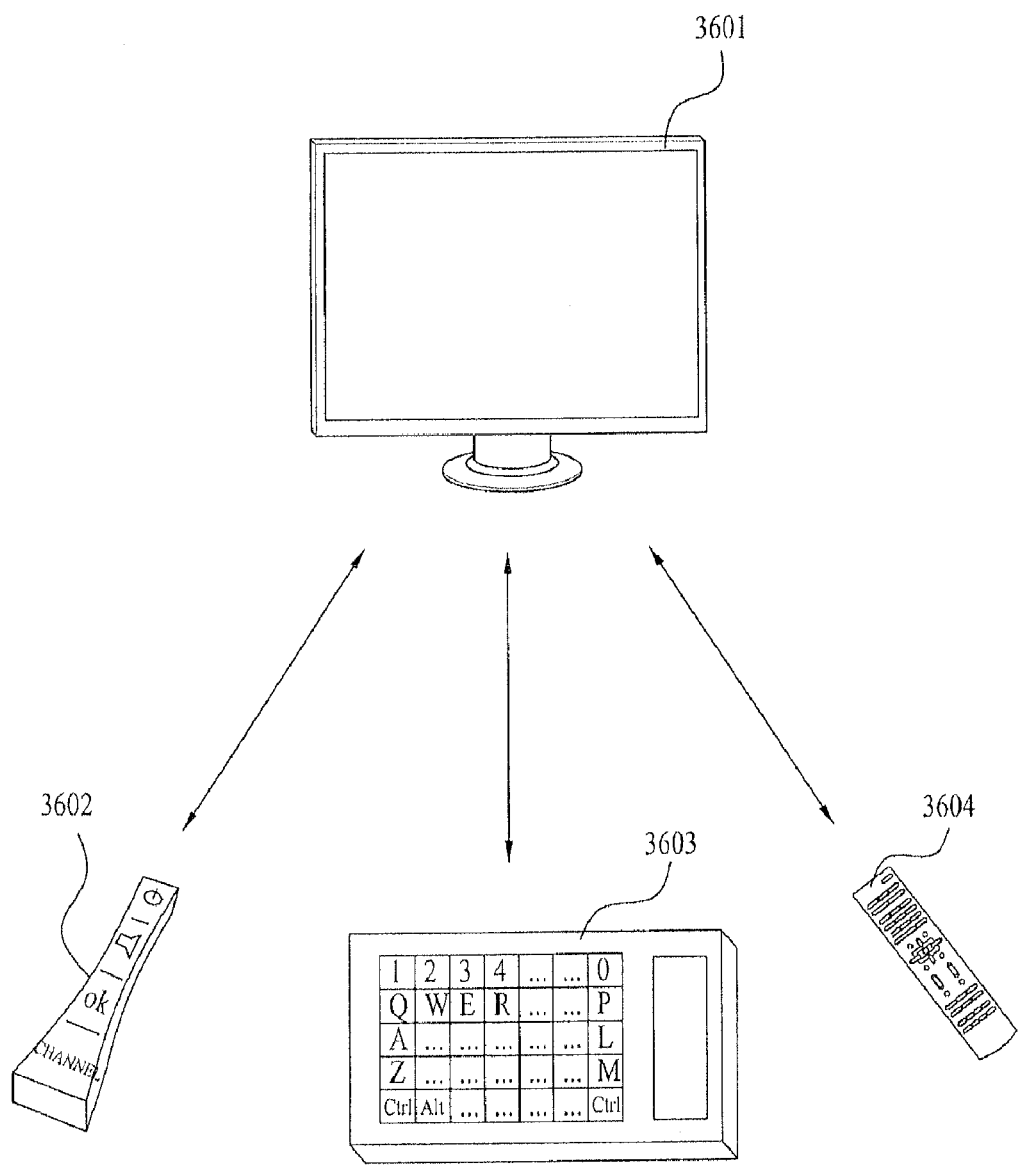
FIG. 36 shows a user interface device (UID) of a display device for use in accordance with any of the aforementioned embodiments and/or display screens.

FIG. 36 shows one embodiment of a user interface device (UID) of the image display device. While FIG. 36 shows one example, in order to perform various operations, a variety of user interface devices available for wired/wireless telecommunication with the image display device 3601 may be used.

Herein, diverse telecommunication standards, such as Bluetooth, RFID (Radio Frequency Identification), IrDA (Infrared Data Association), UWB (Ultra Wideband), ZigBee, DLNA (Digital Living Network Alliance), and so on, may be used as the means of telecommunications.

In addition to the general remote controller 3604, the user interface device may also include a magic remote controller 3602 and a remote controller 3603 equipped with a keyboard and a touchpad, The general remote controller 3604 refers to a remote controller that is equipped with key input buttons and a number keypad.

Also, the magic remote controller 3602 corresponds to a remote controller equipped with a Gyro sensor, which is mounted in the inside of the magic remote controller 3602, thereby being capable of sensing (or acknowledging) shaking or rotating movements of the hand of the user gripping (or holding) the magic remote controller 3602.

More specifically, when the user holds the remote controller and moves the remote controlled in vertical (up-and-down) or horizontal (left-and-right) directions, a pointer displayed on the screen moves accordingly, thereby enabling the user to easily select a wanted channel or menu item.

Furthermore, the remote controller 3603 equipped with a keyboard and a touchpad allows the user to easily perform the operations of inputting text into the image display device by using the keyboard. And, by using the touchpad, the user may be able to easily input signals for moving the pointer or signals for enlarging or reducing still images or moving images.

More specifically, by using the above-described variety of user interface devices, the user may be capable of easily performing operations such as character input or menu item selection.

One or more embodiments described herein provide a method for providing a shortcut and the image display device thereof have the following advantages. Even if the types and number of functions or applications that can be executed by the image display device increase, by providing a Shortcut menu, the present invention enables the user to easily and conveniently search and use menu items or applications for executing the functions wanted (or requested) by the user within a single display screen.

Also, even when the image display device is already performing an operation, such as showing (or playing) a broadcast program or executing an application, the method for providing a shortcut and the image display device thereof may enhance user convenience by allowing the user to immediately call on a Shortcut menu through the input of a Hot Key.

Furthermore, by including a list of characters that can be set up as shortcut objects in the Shortcut menu, the method for providing a shortcut and the image display device thereof may enable the user to intuitively recognize (or identify) which shortcut object to select in order to use the wanted function.

More specifically, the method for providing a shortcut and the image display device thereof may provide convenience for the users and may also provide user interfaces that are suitable for the usage of converged image display devices.

Figure 37:
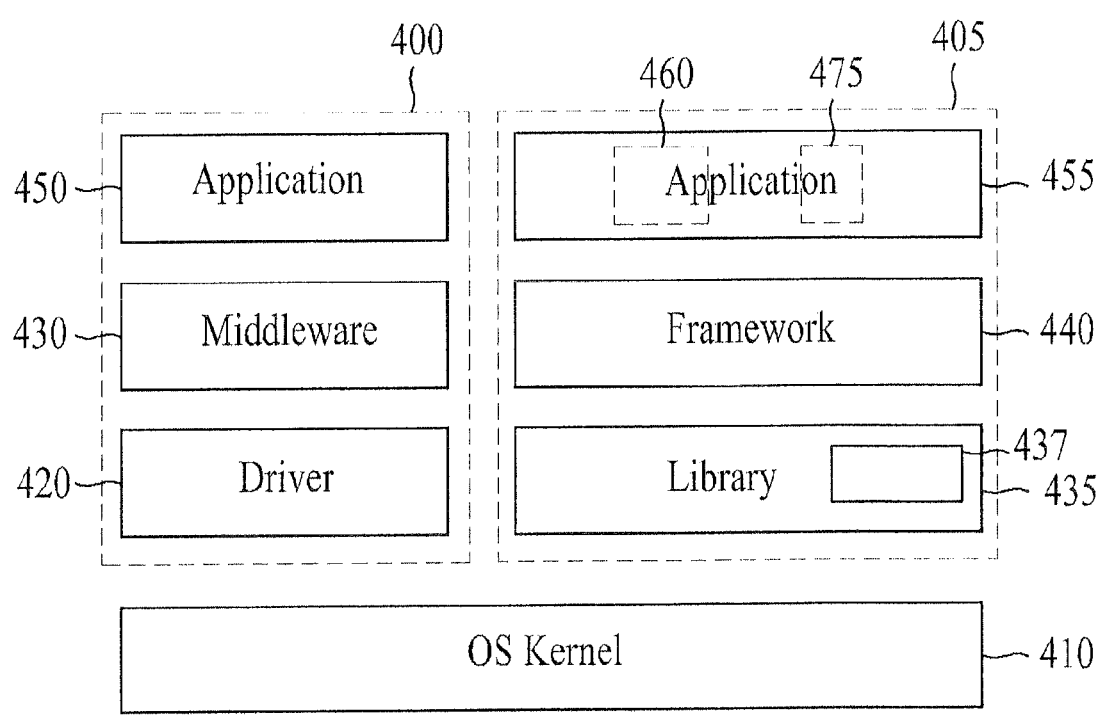
FIG. 37 shows an example of a platform structure for the display device.
Figure 38:
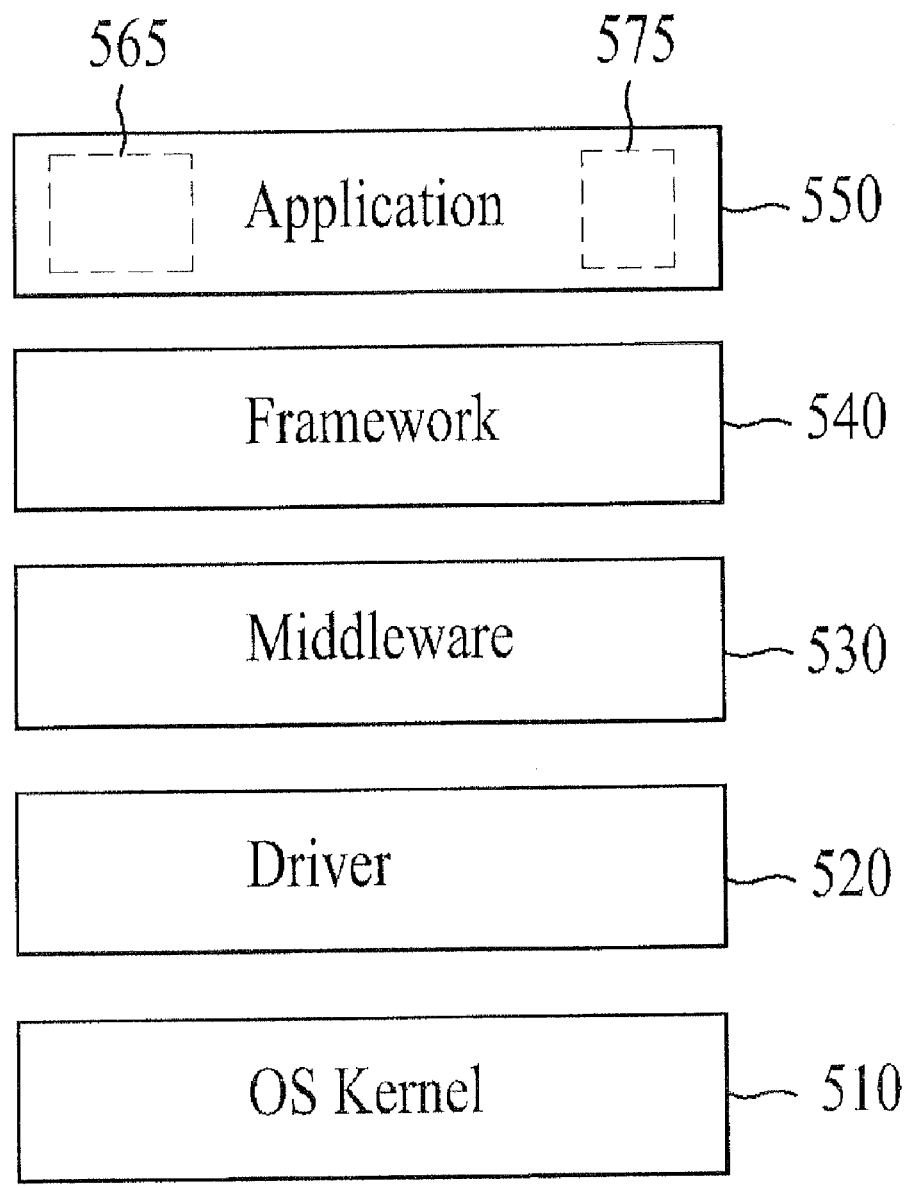
FIG. 38 shows another example of a platform structure.

FIG. 37 shows one example of a platform structure of any one of display devices described herein, and FIG. 38 shows another example of a platform structure. Either platform may include or operate based on operating system (OS)based software to perform the aforementioned various operations.

Referring to FIG. 37, a platform of any one of the display devices according to the embodiments of the present invention is a split type platform and can be designed in such a manner that it is split into a legacy system platform 400 and a smart system platform 405. An OS kernel 410 may be used in common for the legacy system platform 400 and the smart system platform 405.

The legacy system platform 400 includes a driver 420 on the OS kernel 410, a middleware 430, and an application layer 450.

The smart system platform 405 includes a library 435 on the OS kernel 410, a framework 440, and an application layer 455.

The OS kernel 410 is a core of the operating system, and can perform at least one of driving of a hardware driver, security of hardware and processor in the display device, efficient management of system resources, memory management, interface for hardware based on hardware abstraction, multi-process, and schedule management based on multi-process when the display device is driven. In the mean time, the OS kernel 410 may further perform power management.

The hardware driver in the OS kernel 410, for example, may include a display driver, a Wi-Fi driver, a Bluetooth driver, a USB driver, an audio driver, a power manager, a binder driver, and a memory driver.

Also, the hardware driver in the OS kernel 410 may further include a character device driver, a block device driver, and a network device driver as drivers for hardware devices therein. The block device driver may need a buffer equivalent to unit size in accordance with data transmission of a specific block unit. The character device driver may not need a buffer due to data transmission in a basic data unit, i.e., character unit.

The OS kernel 410 can be implemented as the kernel based on various operating systems such as unix (linux) based operating system and window based operating system. Also, the OS kernel 410 is an opened OS kernel, and can be used generally by other electronic devices.

The driver 420 is located between the OS kernel 410 and the middleware 430, and drives the device for operation of the application layer 450 together with the middleware 430. For example, the driver 420 may include drivers such as a micom in the display device, a display module, a graphic processing unit (GPU), a frame rate converter (FRC), a general purpose input/output pin (GPIO), HDMI, system decoder or demultiplexer (SDEC), video decoder (VDEC), audio decoder (ADEC), a personal video recorder (PVR), and an inter-integrated circuit (I2C). These drivers interact with the hardware driver in the OS kernel 410.

Also, the driver 420 may further include a driver of a remote controller, especially a spatial remote controller which will be described later. The driver of the spatial remote controller may be provided in the OS kernel 410 or the middleware 430 in addition to the driver 420.

The middleware 430 is located between the OS kernel 410 and the application layer 450, and serves as a medium that allows data to be exchanged between hardware and software. In this case, a standardized interface can be provided, various environments can be supported, and mutual interaction between tasks of different systems can be performed.

Examples of the middleware 430 in the legacy system platform 400 include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware.

The application layer 450 on the middleware 430, namely the application layer 450 in the legacy system platform 400 may include a user interface application on various menus in the display device. The application layer 450 on the middleware 430 can be edited by selection of the user, and can be updated through the network. This application layer 450 enables the user to input a desired menu of various user interfaces in accordance with input of the remote controller during viewing broadcasting image.

Also, the application layer 450 in the legacy system platform 400 may further include at least one of TV guide application, Bluetooth application, reservation application, digital video recorder (DVR) application, hot key application.

The library 435 in the smart system platform 405 is located between the OS kernel 410 and the framework 440, and can form the base of the framework 440. For example, the library 435 includes security library, web engine library and media library, wherein the security library includes secure socket layer (SSL), the web engine library includes WebKit, libc (c library), and video and audio formats, and the media library includes media framework. The library 435 can be made based on C or C++, and can be exposed to a developer through the framework 440.

The library 435 may include a runtime 437 that includes a core java library and a virtual machine (VM). The runtime 437 forms the base of the framework 440 together with the library 435.

The virtual machine (VM) may be a virtual machine that enables a plurality of instances, i.e., multi-tasking. The virtual machine (VM) may be allocated in accordance with each application in the application layer 455. At this time, for schedule adjustment and interconnection between the plurality of instances, the binder driver (not shown) in the OS kernel 410 may be driven.

In the mean time, the binder driver and the runtime 437 can connect java based application with C based library. The binder driver and the runtime 437 can correspond to middleware of the legacy system.

The framework 440 in the smart system platform 405 includes a program based on the application in the application layer 455. The framework 440 is compatible with any one of the applications and enables reuse, movement or exchanges of components. The framework 440 may include a support program, and a program that compiles other software elements. For example, the framework 440 may include a resource manager, an activity manager related to activities of the application, a notification manager, and a content provider for briefing of information shared between the applications. The framework 440 can be made based on JAVA.

The application layer 455 on the framework 440 includes various programs that can be driven and displayed in the display device 100. For example, the application layer 455 may include core application that includes at least one of email, short message service (SMS), calendar, map, and browser. This application layer 455 can be made based on JAVA.

Also, the application layer 455 can be divided into application 465 that can be stored in the display device 100 and cannot be deleted by the user and application 475 that can be downloaded through the external device or network and can freely be installed or deleted by the user.

Internet phone service, video on demand (VOD) service, web album service, social networking service (SNS), location based service (LBS), map service, web search service and application search service may be performed by network access through the application in the application layer 455. Also, various functions such as games and schedule management may be performed through the application in the application layer 455.

Referring to FIG. 38, a platform of any one of the display devices according to the embodiments of the present invention is an integrated type platform and includes an OS kernel 510, a driver 520, a middleware 530, a framework 540, and an application layer 550.

The platform of FIG. 38 is different from that of FIG. 37 in that the library 435 illustrated in FIG. 37 is omitted and the application layer 550 is an integrated layer. The driver 520 and the framework 540 correspond to those of FIG. 37.

The platform of FIG. 38 can be designed such that the library 435 illustrated in FIG. 37 is incorporated into the middleware 530 illustrated in FIG. 38. In other words, the middleware 530 includes legacy system middleware and display system middleware.

The legacy system middleware may include data broadcasting related middleware, i.e., multimedia and hypermedia information coding experts group (MHEG) middleware and advanced common application platform (ACAP) middleware, broadcast information related middleware, i.e., PSIP middleware and SI middleware, and peripherals communication related middleware, i.e., DLNA middleware. The display system middleware may include security library, web engine library and media library, wherein the security library includes secure socket layer (SSL), the web engine library includes WebKit, libc, and the media library includes media framework. The display system middleware may further include runtime described above.

The application layer 550 in the legacy system may include menu application, TV guide application, and reservation application while the application layer 55 in the display system may include email, short message service (SMS), calendar, map, and browser.

The application layer 550 may be divided into application 565 that can be stored in the display device 100 and cannot be deleted by the user and application 575 that can be downloaded through the external device or network and can freely be installed or deleted by the user.

Based on the aforementioned platforms of FIG. 37 and FIG. 38, various API(Application Programming Interface) and SDK(Software Development Kit) can be opened for an application development. In the future or present time. Moreover, API can be implemented by calling the function that provides a connection to specific subroutine for implementation in a program.

For example, Those API and SDK can be opened by a source involved with hardware driver in OS kernel 410 such as display driver, Wi-fi driver, Bluetooth driver, USB driver, Audio driver, and so on. According to other embodiment of the present invention, those API and SDK can be opened by a related source in a driver 420 such as a micom in the display device, a display module, a graphic processing unit (GPU), a frame rate converter (FRC), system decoder or demultiplexer (SDEC), video decoder (VDEC), audio decoder (ADEC), a spatial remote controller and so on. According to another embodiment of the present invention, those API and SDK can be opened by a related source such as PSIP involved with broadcasting information, SI middleware or DLNA middleware.

Any developers can develop at least one of application that is used for display device 100 control or ran in display device 100 based on the aforementioned platforms of FIG. 37 and FIG. 38 by using those various open API.

The aforementioned platforms of FIG. 37 and FIG. 38 can be used generally for various electronic devices as well as the display device. In the mean time, the platforms of FIG. 37 and FIG. 38 may be stored or loaded in the memory module 202 or the control module 203 illustrated in FIG. 2 or a separate processor (not shown). Also, a separate application processor (not shown) for implementing application may further be provided.

One more or more embodiments described herein provide a method of generating shortcuts for accessing content for display on a display device. These and/or other embodiments further provide a method of providing a shortcut of a display device and a display device adopting the same that can enable a user to easily perform a wanted function from the image display device.

One or more embodiments further provide a method of providing a shortcut of a display device and a display device adopting the same that can enable a user to easily and intuitively identify a wanted shortcut object, by setting up a short text of a predetermined language as a shortcut object.

In accordance with one embodiment, a method for providing a shortcut of a display device includes displaying a Shortcut menu including a list of characters written in a specific language through a user interface; provided with a selection of a specific character through the user interface; and executing a Shortcut respective to the selected character.

In accordance with another embodiment, a display device includes a display unit configured to display a Shortcut menu; a user input interface unit configured to receive a specific Character Select signal of the Shortcut menu; and a controller configured to output the Shortcut menu including a list of characters written in a specific language to the display unit through a user interface, and, when a specific character is selected from the list of characters based upon the specific Character Select signal, to execute a Shortcut respective to the selected character.

In accordance with another embodiment, a multifunctional display device comprises a tuner configured to tune to a channel of a broadcast signal; a network interface configure to receive data packets; a display module; a wireless input interface configure to receive signals from a wireless remote control device; a storage device to store data; a processor to control the display module based on at least one of broadcast signal, data packets or signals received from the wireless remote control device The processor is configured to execute the following (1) an instruction to display a shortcut menu including at least one of alphabetical characters, numeric characters, symbols or icons and (b) an instruction to assign at least one alphabetical character, numeric character, symbol or icon in the shortcut menu to one of a broadcast channel tuned by the tuner, a network address from which data packets are received through the network interface or an application stored in the storage device.

The characters, symbols or icons previously assigned are displayed differently from the characters, symbols or icons which have not been assigned. Also, the processor executes an instruction to display one or more applications with or in the shortcut menu. Also, The shortcut menu is displayed with content displayed on a screen of the display module, and/or is displayed with an edit icon to allow for editing said assignment.

In addition, information is displayed when one of the characters, symbols or icons is selected from the shortcut menu, said information identifying at least two broadcast channels, at least two network addresses, and at least two applications, or at least two of a broadcast channel, a network address, or an application.

In addition, a list of applications, network addresses, or channels is displayed when one of the characters, symbols, or icons is selected. Also, the processor executes: a instruction to display a list of the characters, symbols, or icons, and a plurality of broadcast channels, network addresses, or application assigned to respective ones of the characters, symbols, or icons in the list.

In addition, the processor executes an instruction to display an icon identifying the assigned channel, network address, or application, the icon displayed simultaneously and at a position adjacent the character, symbol, or icon in the shortcut menu when the character, symbol, or icon is selected.

In addition, the processor executes an instruction to display a menu identifying a plurality of users, each user corresponding to a different shortcut menu. Also, the processor executes an instruction to display first content corresponding to an alphabetical character, numeric character, symbol or icon in the shortcut menu when a cursor overlaps the alphabetical or numeric character, symbol or icon, the first content displayed in a first area of a screen of the display module.

In addition, currently viewed content is displayed in a second area of the screen simultaneously with display of the first content in the first area. Also, the shortcut menu is displayed in a toolbar displayed on a screen of the display module simultaneously with content currently being viewed, the toolbar including a window for receiving one of the alphabetical characters or numeric characters.

In accordance with another embodiment, a multifunctional display device comprises a tuner configured to tune to a channel of a broadcast signal; a network interface configure to receive data packets; a display module; a wireless input interface configure to receive signals from a wireless remote control device; a storage device to store data; a processor to control the display device based on at least one of broadcast signal, data packets or signals received from the wireless remote control device The processor is configured to execute the following: (1) an instruction to execute at least one shortcut when at least one of an alphabetical character, a number, symbol or icon is selected through the wireless remote control device, the at least one shortcut corresponding to one of a broadcast channel to be tuned by the tuner, a network address from which data packets are to be received through the network interface or an application stored in the storage device to be executed, or (2) an instruction to display a list of items for selection using the wireless remote control device when at least one character, number, symbol or icon is selected through the wireless remote control device, an item corresponding to one of a broadcast channel to be tuned by the tuner, a network address from which data packets are to be received through the network interface or an application stored in the storage device to be executed.

In addition, a list of channel identifiers, website identifiers, or application identifiers may be displayed with or in the list, and/or the list may be displayed simultaneously with content currently viewed on a screen of the display module. Also, the characters, symbols or icons previously assigned are displayed in the list differently from characters, symbols or icons which have not been assigned a shortcut.

In accordance with another embodiment, a computer readable medium for execution by a processor of a multifunctional display device, comprising: means for storing in a memory device a plurality of shortcut objects, a shortcut object corresponding to at least one of alphabetical characters, numbers, symbols or icons; and means for associating a shortcut object to at least two of the following: (1) a menu item, (2) an application, (3) a broadcast channel, and (4) a network address. The means may be any number of software or machine-readable instructions.

Also, one of the characters, numbers, symbols or icons is associated with at least two selected from (1) to (4), and means may be included for displaying information identifying the shortcut objects in association with at least two of (1) to (4), and for simultaneously displaying content corresponding to one of the shortcut objects.

Figure 39:
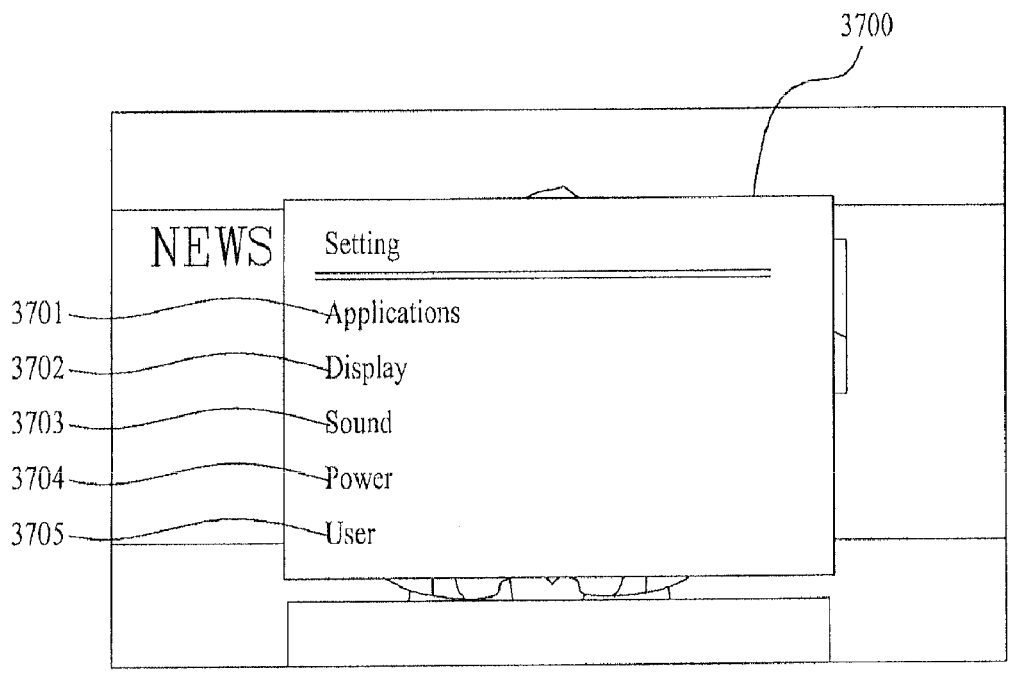
FIG. 39 shows a screen including a Setup menu.
Figure 39:
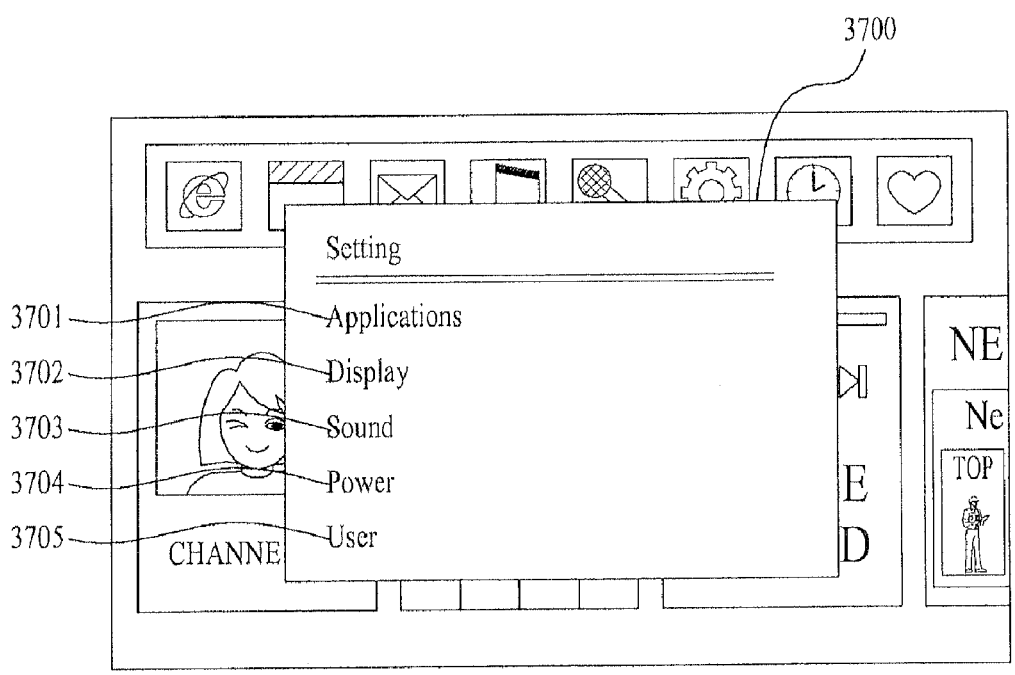

FIG. 39 shows a screen including a Setup menu.

According to the embodiment of the present invention, when the display device receives a Select signal of a predetermined menu item for calling on a Setup menu, or when the display device receives a Hot Key Input signal, the display device may display the Setup menu 3700.

The Setup menu 3700 may include a menu item 3701 for application management, a menu item 3702 for adjusting the screen, a menu item 3703 for adjusting the audio output, a menu item 3704 for adjusting the power settings, and a menu item 3705 for correcting (renewing or updating) user information.

More specifically, by selecting one or more menu items from the multiple menu items, the user may determine (or set-up) and control setup details of the display device.

Additionally, the Setup menu 3700 may be displayed by being overlaid on the screen of a content that is currently being provided to the display device, as shown in FIG. 39(*a*). Alternatively, the Setup menu 3700 may also be displayed in semi-transparent colors, thereby preventing the screen of the current content from being interrupted.

Furthermore, the Setup menu 3700 may be displayed by being overlaid on the Home screen, as shown in FIG. 39(*b*). Alternatively, the Setup menu 3700 may also be displayed in semi-transparent colors, thereby preventing the Home screen from being interrupted.

Figure 40:
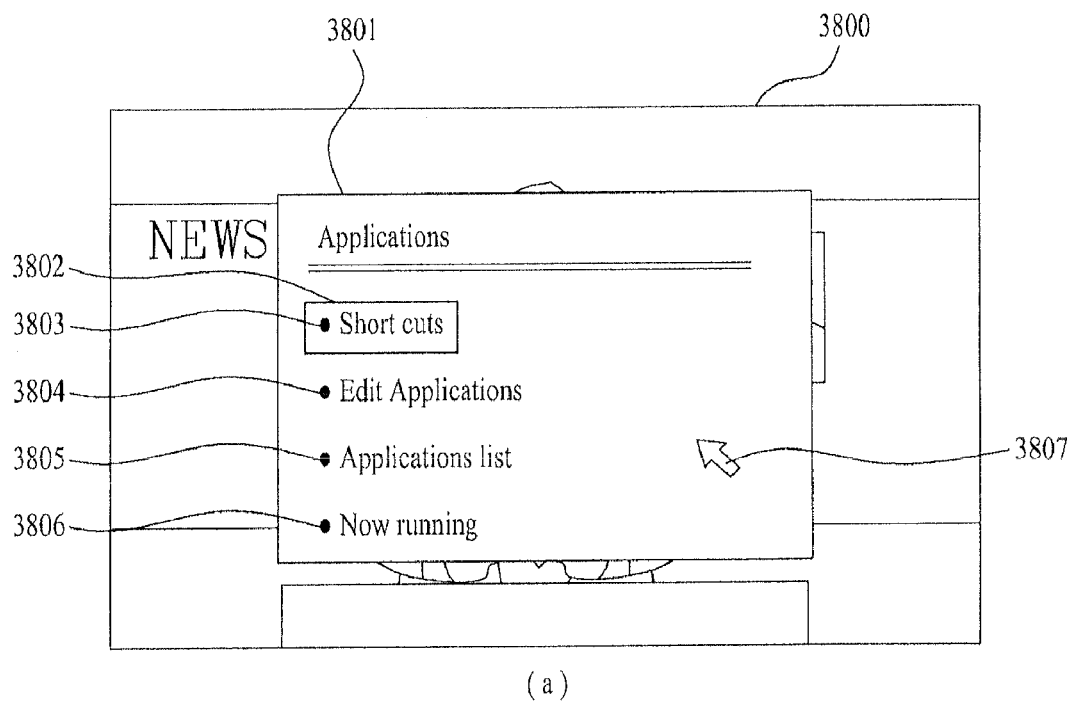
FIG. 40 shows a screen including an Application Management menu.
Figure 40:
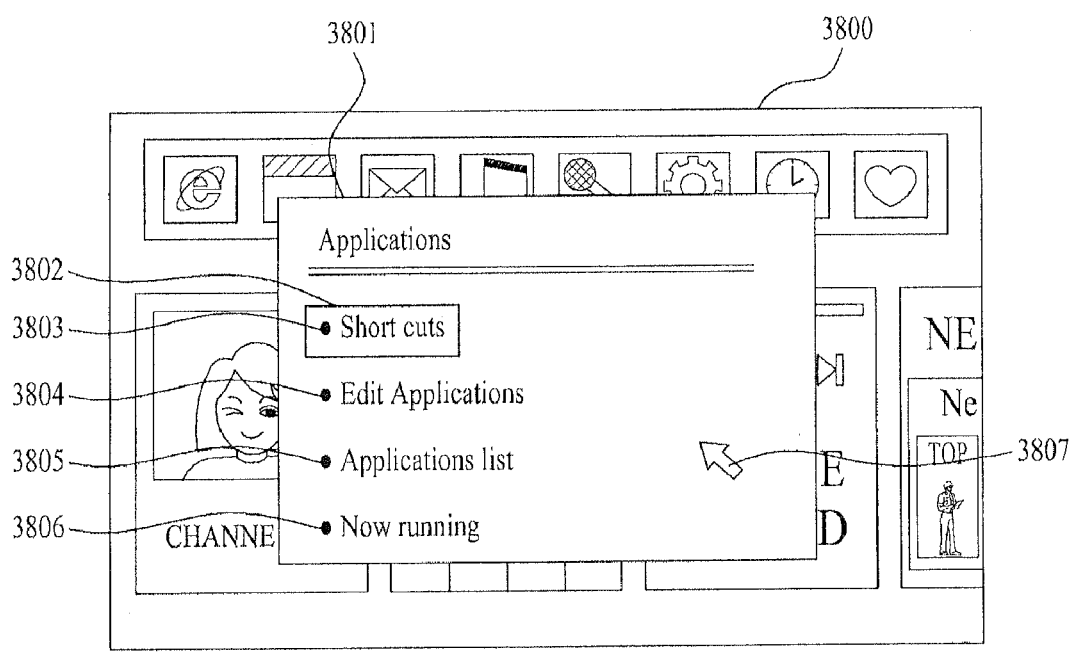

FIG. 40 shows a screen 3800 including an Application Management menu.

According to the embodiment of the present invention, when the display device receives a Select signal of a predetermined menu item for calling on an Application Management menu 3801, or when the display device receives a Hot Key Input signal, the display device may display the Application Management menu 3801.

The Application Management menu 3801 may include a menu item 3803 for setting up a shortcut, a menu item 3804 for editing Application items, a menu item 3805 for editing an Application list, and a menu item 3806 for verifying the Application that is currently being executed.

Also, by moving a selection bar 3802 or a pointer 3807 in order to select a menu item from the Application Management menu 3801, the user may input a Select signal of a specific menu item.

More specifically, by selecting one or more menu items from the multiple menu items, the user may perform operations for managing the Applications of the display device.

Furthermore, just as the Setup menu 3700 described above with reference to FIG. 39, the Application Management menu 3801 may be displayed by being overlaid on the screen of a content that is currently being provided to the display device, as shown in FIG. 40(*a*). Alternatively, the Application Management menu 3801 may also be displayed by being overlaid on the Home screen, as shown in FIG. 40(*b*).

Figure 41:
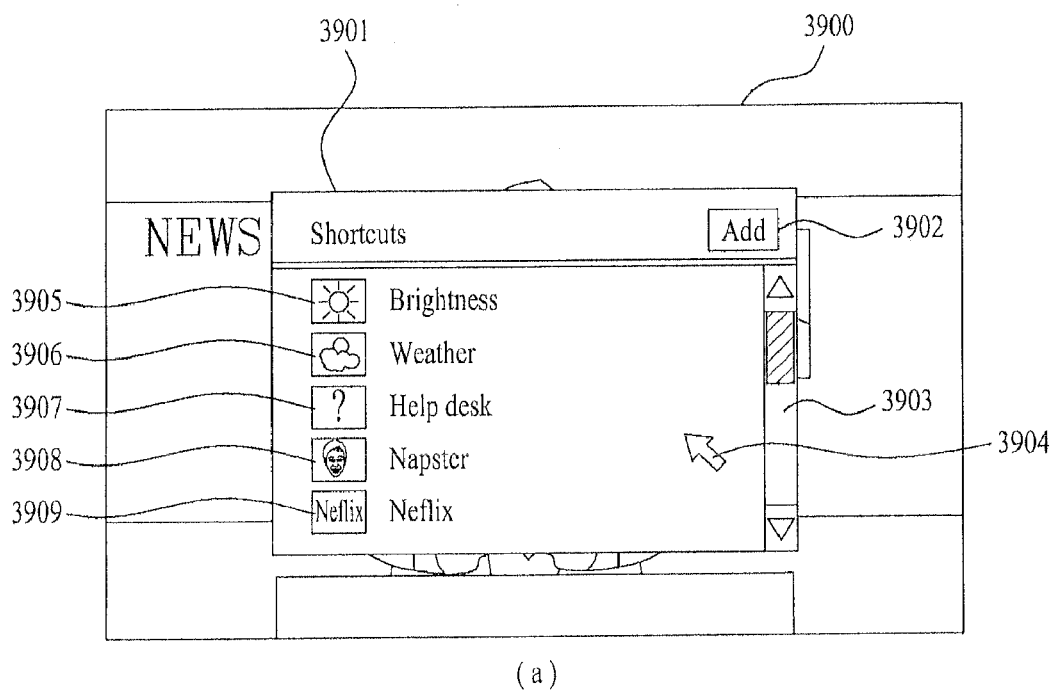
FIG. 41 shows a screen including a Shortcut Setup menu.
Figure 41:
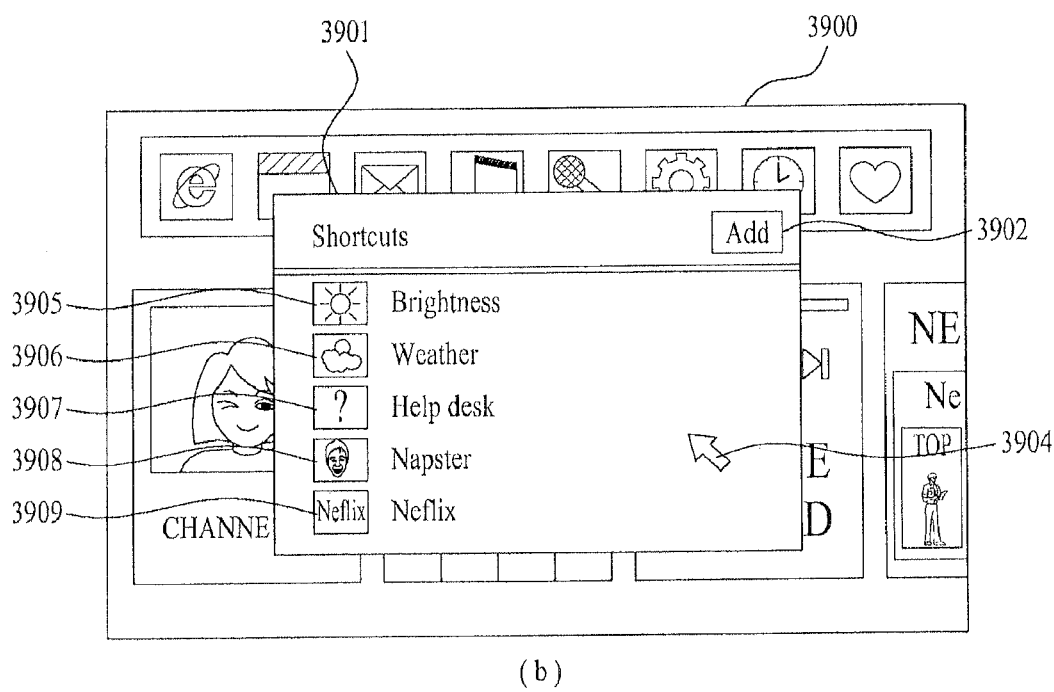

FIG. 41 illustrates a screen 3900 including a Shortcut Setup menu 3901 of the display device according to an embodiment of the present invention.

According to the embodiment of the present invention, when the display device receives a Select signal of a predetermined menu item for calling on a Shortcut Setup menu 3901, or when the display device receives a Hot Key Input signal, the display device may display the Shortcut Setup menu 3901.

The Shortcut Setup menu 3901 may include an Application list including menu items 3905, 3906, 3907, 3908, and 3909 for each application available in the display device, a menu item 3902 for adding new shortcuts, and a scroll bar 3903 for scrolling the Application list.

The Application list may include Application menu items 3905, 3906, 3907, 3908, and 3909 for each application available in the current display device. Herein, each of the Application menu item may include an Application name or an icon associated with the Application, thereby including information that enables the functions provided in each Application to be recognized.

Therefore, when the user wishes to add a shortcut for an Application, the user may use the Application list so as to search for and select the wanted Application.

Moreover, the user may use a pointer 3904 to select one or more Application menu items. Then, when the user selects the Add Shortcut menu item 3902, the display device may be controlled to add a shortcut for the selected Application.

Additionally, when the user uses the pointer 3904 to select the Add Shortcut menu item 3902, and when the user selects one or more Application items from the Application list, the display device may be controlled to add a new shortcut for the selected Application.

Also, when it is difficult to display all of the Application menu items within a single screen, the Application list may add a scroll bar 3903, so as to enable the user to move around the Application list page.

Furthermore, just as the Setup menu 3700 described above with reference to FIG. 39, the Shortcut Setup menu 3901 may be displayed by being overlaid on the screen of a content that is currently being provided to the display device, as shown in FIG. 41(*a*). Alternatively, the Shortcut Setup menu 3901 may also be displayed by being overlaid on the Home screen, as shown in FIG. 41(*b*).

Figure 42:
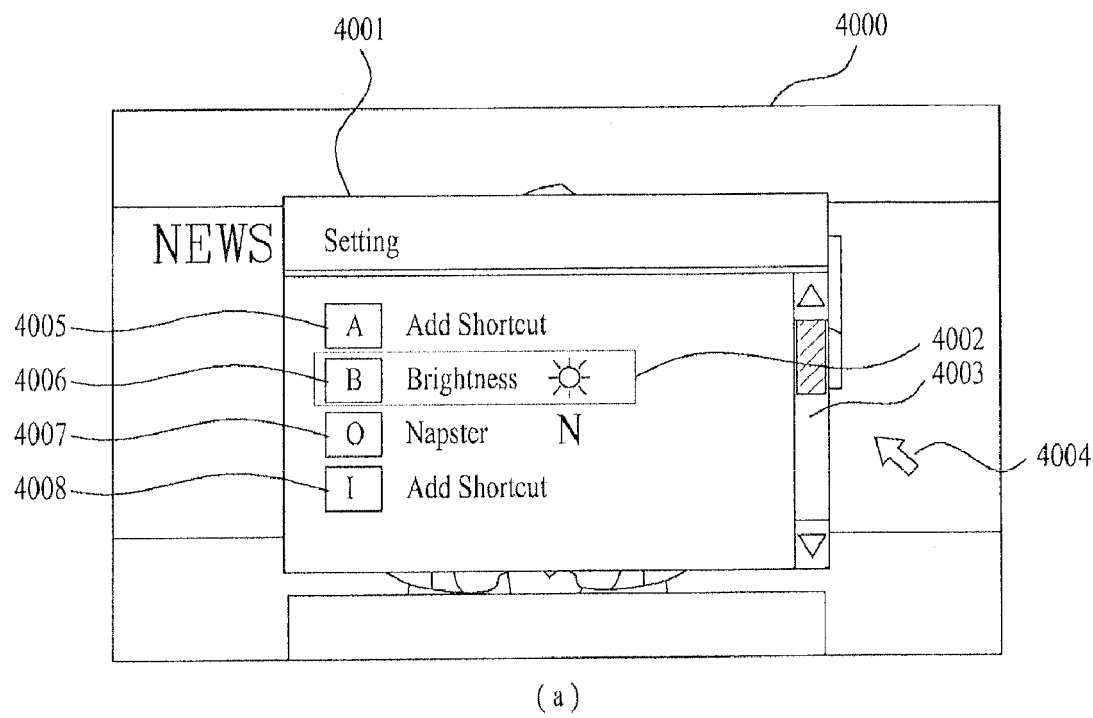
FIG. 42 shows a screen including a Shortcut list.
Figure 42:
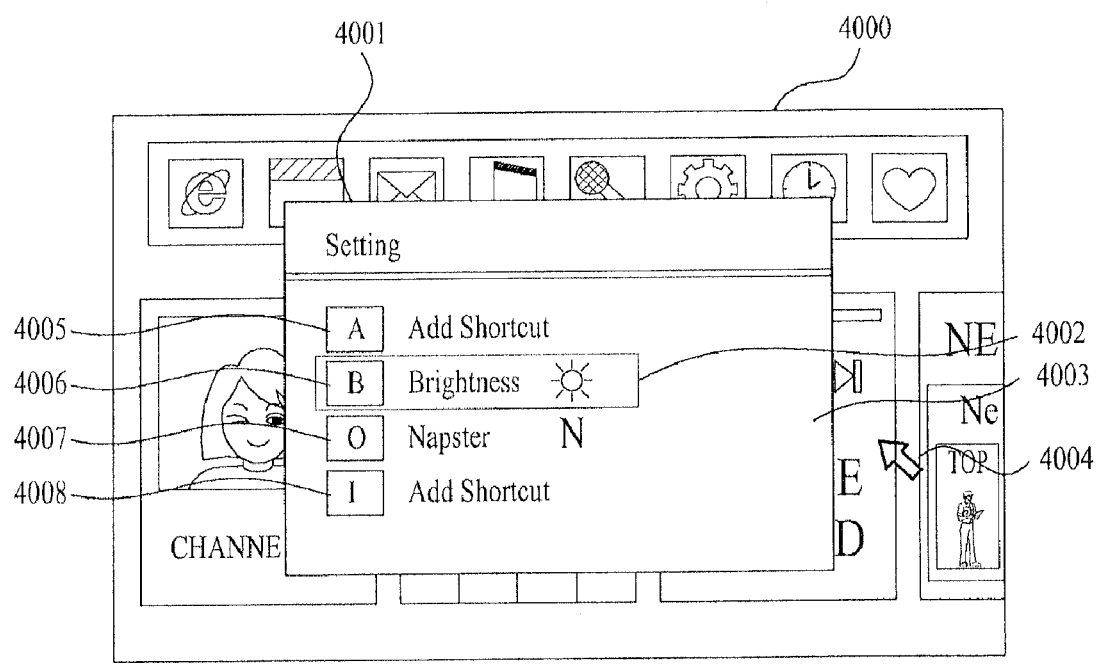

FIG. 42 shows a screen 4000 including a Shortcut list 4001.

According to the embodiment of the present invention, when the display device receives a Select signal of a predetermined menu item for calling on a Shortcut list 4001, or when the image display device receives a Hot Key Input signal, the display device may display the Shortcut list 4001.

The Shortcut list 4001 may search for setup information pre-stored in the display device, thereby including the shortcuts stored in the current display device. Therefore, the Shortcut list 4001 may include a list of predetermined letters (or characters) 4005, 4006, 4007, and 4008 that are respectively designated to the Shortcut items, a selection bar 4002, a Shortcut list scroll bar 4003, and a pointer 4004.

More specifically, when the Shortcut list 4001 is displayed on the display device, the user may verify a mapping relation between an Application or function and a letter (or character) (i.e., the user may verify which Application or function is mapped to which letter (or character)) by using the Shortcut list 4001. And, when the user selects a predetermined letter (or character) by using the selection bar 4002 or the pointer 4004, the user may be able to execute the Application or function mapped to the selected letter (or character), or the user may be able to edit the Application or function mapped to the selected letter (or character).

Also, in the Shortcut list 4001, letters (or characters) 4006 and 4007 having the current Application or function mapped thereto may include letter (or character) or icon information respective to the mapped Application or function. Alternatively, letters (or characters) 4005 and 4008 that do not have the current Application or function mapped thereto may include letters (or characters) notifying that a mapped Application or function does not exist.

Moreover, when the letter (or character) 4005 or 4008 that does not have the current Application or function mapped thereto is selected by the selection bar 4002 or the pointer 4004, a list of Applications available in the display device or a list of functions of the display device may be displayed, thereby enabling the specific Application or function to be mapped to the selected letter (or character).

Additionally, when it is difficult to display all of the Shortcut items within a single screen, the Shortcut list may use the scroll bar 4003, so as to enable the user to move around the Shortcut list page.

Furthermore, just as the Setup menu 3700 described above with reference to FIG. 39, the Shortcut list 4001 may be displayed by being overlaid on the screen of a content that is currently being provided to the display device, as shown in FIG. 42(*a*). Alternatively, the Shortcut list 4001 may also be displayed by being overlaid on the Home screen, as shown in FIG. 42(*b*).

The suffixes "module" and "unit" that are mentioned in the elements used to describe the embodiments described herein are merely used for the purpose of simplifying the description of the present invention. Therefore, the respective suffix itself does not have any specific or important meaning or role within the context of the following description. Therefore, the suffixes "module" and "unit" may also be alternately used.

Meanwhile, the image display device herein may correspond to an intelligent image display device that is also equipped with a computer supporting function in addition to the broadcast program receiving function. Accordingly, since the image display device is committed (or devoted) to its broadcast program receiving function and is also supplemented with an internet browsing function, the image display device may be equipped with an interface that can be more conveniently used as compared to an hand-writing type inputting device, a touch screen or a space remote controller.

Furthermore, being supported with a wired or wireless (or radio) internet function, the image display device may be connected to (or may access) the internet and a computer, thereby being capable of performing email transmission, web browsing, internet banking or gaming functions. In order to perform such variety of functions, the image display device may adopt a standardized OS for general purpose.

More specifically, since a variety of applications may be easily added to or deleted from the display device within an OS kernel for general purpose, the image display device described in the description of the present invention may be capable of performing a wide range of user-friendly functions. An example of such image display devices may be Smart TVs.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multifunctional display device, comprising:
   a tuner configured to tune to a channel of a broadcast signal;
   a network interface configure to receive data packets;
   a display module;
   a wireless input interface configure to receive signals from a wireless remote control device; a storage device to store data;
   a processor to control the display module based on at least one of broadcast signal, data packets or signals received from the wireless remote control device, wherein the processor is configured to execute the following:
   (a) an instruction to display a shortcut menu including a list of characters in a specific language, wherein the shortcut menu is displayed with content on a screen of the display module;
   (b) an instruction to receive one or more signals to select at least one of the characters in the list of the shortcut menu; and
   (c) an instruction to assign the at least one character selected from the list to one of a broadcast channel tuned by the tuner, a network address from which data packets are received through the network interface, or an application stored in the storage device.

2. The device of claim 1, wherein at least one of the characters previously assigned in the list is displayed differently from one or more of the characters which have not been assigned.

3. The device of claim 1, wherein the processor executes an instruction to display one or more applications with or in the shortcut menu.

4. The device of claim 1, wherein the shortcut menu is displayed with an edit icon to allow for editing said assignment.

5. The device of claim 1, wherein:
   information is displayed when said at least one of the characters is selected from the shortcut menu, said information identifying at least two broadcast channels, at least two network addresses, and at least two applications, or at least two of a broadcast channel, a network address, or an application.

6. The device of claim 1, wherein a list of applications, network addresses, or channels is displayed when said at least one of the characters is selected.

7. The device of claim 1, wherein the processor executes:
   an instruction to display the list of the characters, and a plurality of broadcast channels, network addresses, or applications assigned to the characters in the list.

8. The device of claim 1, wherein the processor executes:
   an instruction to display an icon identifying the assigned channel, network address, or application, the icon displayed simultaneously and at a position adjacent the character in the shortcut menu when the character is selected.

9. The device of claim 1, wherein the processor executes:
   an instruction to display a menu identifying a plurality of users, each user corresponding to a different shortcut menu.

10. The device of claim 1, wherein the processor executes:
    an instruction to display first content corresponding to one of the characters in the shortcut menu when a cursor overlaps said one of the characters, and wherein the first content is displayed in a first area of the screen of the display module.

11. The device of claim 10, wherein currently viewed content is displayed in a second area of the screen simultaneously with display of the first content in the first area.

12. The device of claim 1, wherein the shortcut menu is displayed in a toolbar displayed on the screen of the display module simultaneously with the content, the toolbar including a window for receiving one of the characters.

13. A multifunctional display device, comprising:
    a tuner configured to tune to a channel of a broadcast signal;
    a network interface configure to receive data packets;
    a display module;
    a wireless input interface configure to receive signals from a wireless remote control device;
    a storage device to store data;
    a processor to control the display device based on at least one of broadcast signal, data packets or signals received from the wireless remote control device, wherein the processor is configure to execute the following:
    (1) an instruction to receive one or more signals through the wireless input interface to select at least one character of a shortcut menu displayed on a screen of the display module, wherein the shortcut menu includes characters in a specific language,
    (2) an instruction to display a list of multiple shortcut objects when the at least one selected character is mapped to the multiple shortcut objects, wherein the multiple shortcut objects correspond to one or more broadcast channels to be tuned by the tuner, one or more network addresses from which data packets are to be received through the network interface, one or more applications stored in the storage device to be executed, or a combination thereof, (3) an instruction to receive a signal to select one of the multiple shortcut objects in the list, and (4) an instruction to execute the selected shortcut object.

14. The device of claim 13, wherein one or more channel identifiers, website identifiers, or application identifiers are displayed with or in the list or menu.

15. The device of claim 13, wherein at least one of the list or menu is displayed simultaneously with content currently viewed on a screen of the display module.

16. The device of claim 13, wherein one or more characters previously mapped to corresponding multiple shortcut objects are displayed in the list differently from characters which have not been mapped to a shortcut object.

17. A non-transitory computer readable medium storing instructions for execution by a processor of a multifunctional display device, comprising:

an instruction to display a shortcut menu including a list of characters in a specific language, wherein the shortcut menu is displayed with content on a screen;

an instruction to receive one or more signals to select at least one of the characters in the list of the shortcut menu; and an instruction to assign the at least one character selected from the list to one of (1) a broadcast channel tuned by the tuner, (2) a network address from which data packets are received through the network interface, or (3) an application stored in the storage device.

18. The computer readable medium of claim 17, wherein the selected character is assigned with at least two selected from (1) to (3).

19. The computer readable medium of claim 17, further comprising:

an instruction to display information identifying shortcut objects in association with at least two of (1) to (3), and an instruction to display content corresponding to one of the shortcut objects.

20. The device of claim 13, wherein the list is displayed with or in the shortcut menu.

* * * * *